United States Patent
Fukuhara

(10) Patent No.: US 6,526,178 B1
(45) Date of Patent: Feb. 25, 2003

(54) PICTURE MAPPING APPARATUS AND PICTURE MAPPING METHOD, AND PICTURE GENERATION APPARATUS AND PICTURE GENERATION METHOD

(75) Inventor: Takahiro Fukuhara, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/239,140

(22) Filed: Jan. 28, 1999

Related U.S. Application Data

(63) Continuation of application No. PCT/JP98/02415, filed on Jun. 1, 1998.

(30) Foreign Application Priority Data

May 30, 1997 (JP) .............................. 9-142510

(51) Int. Cl.[7] .................................. G06K 9/36
(52) U.S. Cl. ................. 382/249; 382/241; 382/243
(58) Field of Search ................ 382/232–233, 382/241, 243, 244, 248, 249, 276; 345/587, 586, 584, 660; 375/240.09, 240.18, 240.24, 240.25

(56) References Cited

U.S. PATENT DOCUMENTS

| | | | |
|---|---|---|---|
| 4,941,193 A | | 7/1990 | Barnsley et al. ............ 382/249 |
| 5,065,447 A | | 11/1991 | Barnsley et al. ............ 382/249 |
| 5,347,600 A | | 9/1994 | Barnsley et al. ............ 382/249 |
| 5,566,284 A | * | 10/1996 | Wakayama ................. 345/587 |
| 5,768,437 A | * | 6/1998 | Monro et al. ............... 382/249 |
| 5,796,407 A | * | 8/1998 | Rebiai et al. ............... 345/586 |
| 5,838,833 A | * | 11/1998 | Ishikawa et al. ............ 382/249 |
| 6,373,989 B1 | * | 4/2002 | Fukuhara et al. ........... 382/241 |

FOREIGN PATENT DOCUMENTS

| | | | | |
|---|---|---|---|---|
| GB | 2272137 | * | 8/1992 | ............ G06F/15/72 |
| JP | 6-223199 | | 8/1994 | ............ G06F/15/72 |
| JP | 6-334868 | | 12/1994 | ............ H04N/1/41 |
| JP | 7-230555 | | 8/1995 | ............ G06T/15/00 |
| JP | 7-264473 | | 10/1995 | ............ H04N/5/262 |
| JP | 8-190626 | | 7/1996 | ............ G06T/1/00 |
| JP | 9-23428 | | 1/1997 | ............ H04N/7/30 |
| JP | 9-508505 | | 8/1997 | ............ H04N/7/28 |
| WO | 95/20296 | * | 7/1995 | ............ H04N/7/28 |

OTHER PUBLICATIONS

Hurd et al., Fractal video compression, 1992, IEEE, 0–8186–2655–0/92, pp. 41–42.*

Yoshiaki Oishi et al., "Image Compressing Method Using Fractal Block Encoding (in Japanese)", Technical Report of the Institute of Television Engineers of Japan, vol. 16, No. 10, Jan. 1992 (Tokyo) pp. 1–6.

M.F. Barnsley, L.P. Hard, "Multimedia Fractal Image Compression (in Japanese)", Mar. 20, 1995, K.K. Toppan, pp. 91–137, 203–254.

* cited by examiner

Primary Examiner—Phuoc Tran
Assistant Examiner—Ishrat Sherali
(74) Attorney, Agent, or Firm—Frommer Lawrence & Haug LLP; William S. Frommer; Dennis M. Smid

(57) ABSTRACT

Picture data which has been caused to undergo repetitive transform encoding (e.g., fractal encoding) is caused to undergo repetitive transform decoding while implementing scaling at a repetitive transform decoding unit 20 to temporarily preserve the decoded picture thus obtained at a buffer section 9. At the shape information calculating section 12, an approach is employed to calculate shape of object while implementing scaling thereto to send the object shape thus obtained (e.g., polygon) to a picture mapping section 10 to implement mapping to decoded picture from the buffer section 9. Thus, there is realized a texture mapping apparatus such that picture quality of texture is difficult to be deteriorated even when deformation takes place, such as, for example, at the time of zooming, etc.

18 Claims, 14 Drawing Sheets

PICTURE MAPPING APPARATUS AND PICTURE MAPPING METHOD, AND PICTURE GENERATION APPARATUS AND PICTURE GENERATION METHOD

This is a continuation of copending International Application PCT/JP98/02415 having an international filing date of Jun. 1, 1998.

TECHNICAL FIELD

This invention relates to such a picture mapping apparatus and such a picture mapping apparatus to decode code word obtained by carrying out iterated transform encoding with respect to picture to restore picture to apply mapping (so-called texture mapping) to the restored picture with respect to polygon having three-dimensional shape, and a picture generation apparatus and a picture generation method for generating picture utilized for its mapping.

BACKGROUND ART

As a conventional representative picture compression system, so-called JPEG (Joint Photographic Coding Experts Group) standardized by ISO is known. As this JPEG system, in the case where DCT (Discrete Cosine Transform) is used so that relatively many bits are allocated, it is known to provide satisfactory encoded/decoded picture. However, when the number of bits to be encoded is lessened to some degree, block distortion peculiar to DCT becomes conspicuous so that degradation becomes conspicuous from a subject point of view.

Apart from this, in recent years, picture compression system utilizing Iterated Function Systems (IFS) begins to be remarked. This system is system such that in the case where a portion of its picture is taken out among the entirety of the picture, it utilizes auto self-analogousness of picture on the premise that another picture similar to picture which has been taken out exists in the form of different sizes among its picture. This repeat transform system is such that block distortion as in the above-described JPEG does not conspicuous, and, since self-analogousness between blocks of different sizes within picture is utilized, there is the merit that it does not depend upon resolution at the time of decoding. This iterated transform encoding is also called fractal encoding as another name, and it is expected that this encoding system is applied to various fields.

For example, there is known the technology that, e.g., function capable of restoring picture by less information quantity that fractal has is applied to the game machine. This technology will now be described with reference to FIG. 1.

The game machine shown in this FIG. 1 is of a structure such that CPU 50, work RAM 51, ROM 52, external I/F (interface) 53, fractal picture painting (drawing) section 55, GC (Graphic Display Controller) 57 and KB (Key board) I/F 60 are connected to system bus 62, and data from the game ROM 54 is read out through the external I/F 53. In addition, VRAM 56 is connected to the fractal picture drawing section 55 and the GC 57, CRT 59 is connected to the GC 57 through graphic I/F 58, and keyboard 61 is connected to the KB (Keyboard) I/F 60.

The operation thereof will now be described.

The game ROM 54 is attached to the external interface 53. When power is turned ON by operation of the power supply switch, the CPU 50 reads out, by a predetermined quantity thereof, the leading portion of the game software from the game ROM 54 to store it into the work RAM 51 to transfer initial (initialization) picture included therewithin to the GC 57. The GC 57 develops initialization picture which has been transferred onto the VRAM 56 and reads out such picture at a fixed period to transfer it to the graphic interface 58 to thereby output it to the CRT59. When the CPU 50 receives command that user has turned ON through the keyboard interface 60 from the keyboard 61, it reads out graphic data corresponding thereto from the work RAM 51 in accordance with this command to transfer it to the GC 57, or to produce movement command of display graphic, etc. to the GC 57.

In the game software which has been read out through the external interface 53 from the game ROM 54 and has been stored into the work RAM 51, fractal picture drawing command is included in addition to the conventional control program or graphic data. This fractal picture drawing command consists of numerical expression (algorithm) in which rule of graphic generation is determined and initial value relating to start position, etc. of generated graphic. The CPU 50 is operative so that when data which has been read out from the work RAM 51 in accordance with command, etc. which has been turned ON from the keyboard 61 is not graphic data, but is fractal picture painting (drawing) command, it transfers such command to the fractal picture painting (drawing) section 55 in place of the GC 57. At the fractal picture drawing section 55 which has received it, graphic elements such as line segments, etc. are generated in succession in accordance with the initial value and the numeric expression to develop them onto the VRAM 56 to thereby paint or draw various graphics, e.g., graphic of natural matter such as mountain, tree or leaf, etc. or character, etc. As described above, it is possible to draw complicated graphic of large data quantity in accordance with fractal picture drawing command of small data quantity.

Meanwhile, in the above-described background technology (art), since fractal is outputted by picture drawing command, graphic which can be painted (depicted) is limited. In addition, since the above-described background technology has not function for compressing/restoring general natural picture, there was the problem that it is limited to pictures which can be represented.

In addition, apart from the above-described technology, as the compression (encoding) technique for texture (picture) in carrying out texture mapping to object shape frequently used at the personal computer or the game machine at present, the JPEG system is used. For this reason, there were the problems that since apparent or seeming resolution of texture is improved at the time of zooming of the object shape, degradation of picture becomes conspicuous and/or sharpness of picture is lost so that obscure picture is displayed.

DISCLOSURE OF THE INVENTION

This invention has been made in such actual circumstances and its object is to provide a picture mapping apparatus and a picture mapping method in which picture of texture is difficult to be degraded when shape of object in which texture of general natural picture is mapped is deformed at zooming, etc. and a picture generation apparatus and a picture generation method for generating picture utilized in such mapping.

In order to solve the above-described object, this invention is characterized in that picture data which has been caused to undergo repetitive transform encoding while implementing scaling thereto to implement mapping to the repeat transform decoded decode picture with respect to picture with respect to object shape obtained while implementing scaling thereto.

Namely, the picture mapping apparatus and the picture mapping method according to this invention are characterized in that iterated transform decoding is carried out while implementing scaling to picture data which has been caused to undergo repeat transform encoding to temporarily preserve decoded picture from the repeat transform decoding unit into the buffer memory to carry out scaling of shape of a predetermined object to calculate the scaled shape of the object to implement mapping to decoded picture with respect to the scaled shape of the object.

Moreover, in the picture mapping apparatus and the picture mapping method according to this invention, picture data which has been caused to undergo repeat transform encoding consists of block No. indicating position of block and transform parameter, and the decoded picture is generated by reproducing transform source block on the basis of block No. to reproduce block located at a predetermined position to carry out scaling of the block to generate block which has been caused to undergo scaling (which will be simply referred to as scaled block as occasion may demand) to implement transform processing corresponding to conversion parameter to block picture corresponding to the scaled block to execute, a predetermined number of times, the transform decoding operations.

Further, in the picture mapping apparatus and picture mapping method in this invention, repeat transform encoded picture data consists of block No. indicating position of block and conversion (transform) parameter, and decoded picture is generated by reproducing transform original block on the basis of block No. to reproduce block located at a predetermined position to carry out scaling of block to generate scaled block to implement transform processing corresponding to conversion (transform) parameter to block picture corresponding to the scaled block to determine degree of convergence between current decode picture obtained by carrying out repetitive transform decoding and decoded picture already decoded with respect to the current decoded picture to repeatedly execute the transform decoding operation on the basis of the result thereof Further, in the picture mapping apparatus and the picture mapping method in this invention, decoded picture finally obtained by carrying out iterated transform decoding is temporarily preserved into the buffer memory.

In addition, in the picture mapping apparatus and the picture mapping method in this invention, in carrying out iterated transform decoding, respective decode pictures obtained by respective transform decoding operations are temporarily stored in succession or sequence into the buffer memory to carry out mapping of respective decoded pictures obtained by respective transform decoding operations from the buffer memory so that shapes of objects which have been caused to undergo scaling in succession are provided.

BEST MODE FOR CARRYING OUT THE INVENTION

Preferred embodiments of this invention will now be described with reference to the attached drawings.

Figure 1:
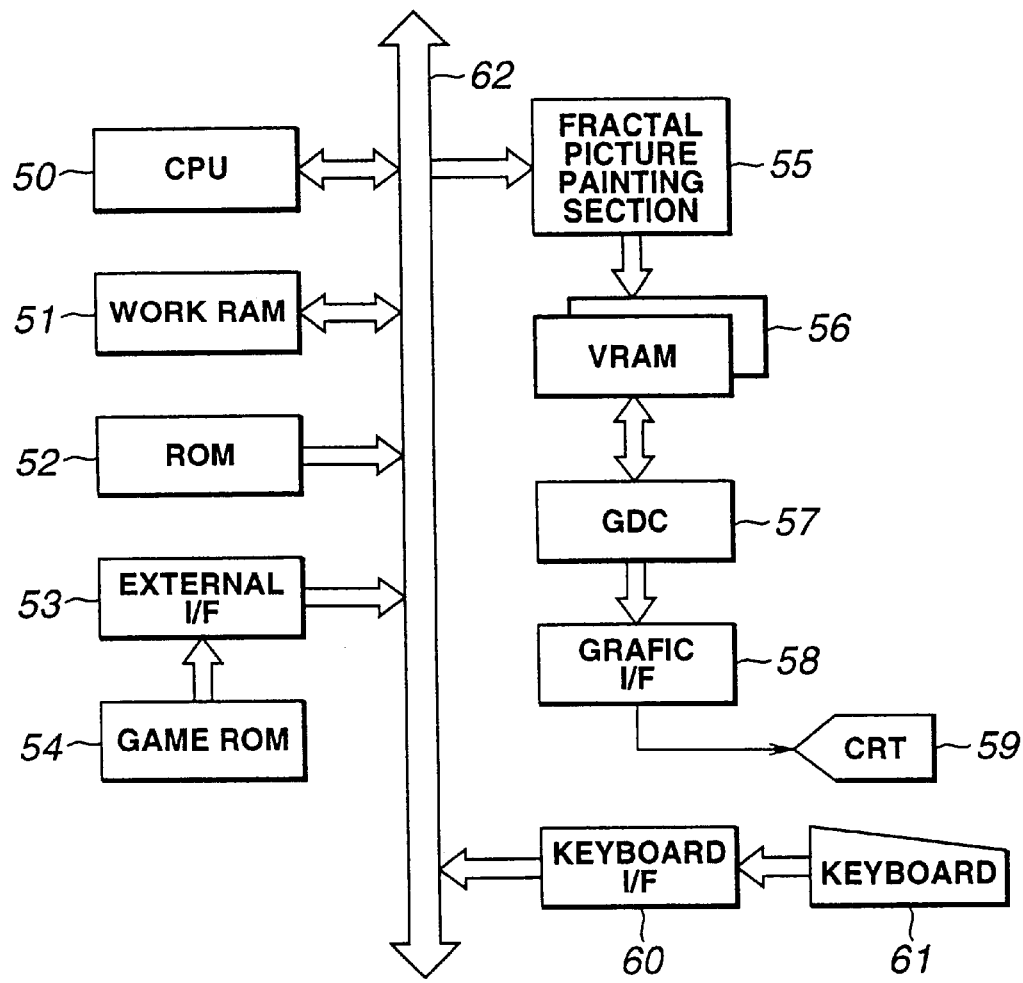
FIG. 1 is a block diagram showing an example of a game machine utilizing picture drawing by decode picture of fractal encoded data according to the background art (technology).
Figure 2:
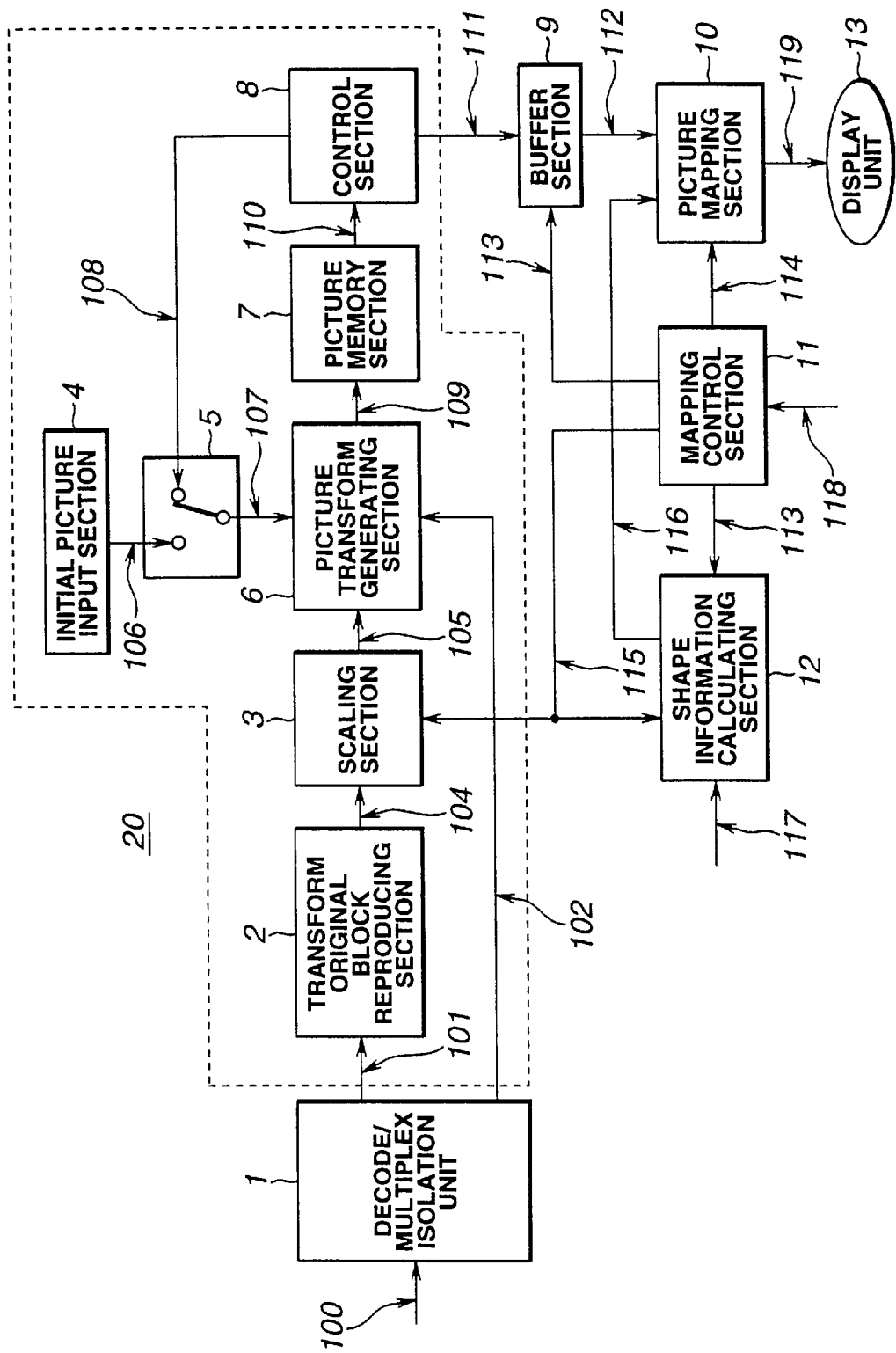
FIG. 2 is a block diagram showing the configuration of a texture mapping apparatus of repetitive transform decode picture which is a first embodiment of this invention.

FIG. 2 is a block diagram showing outline of the configuration of a texture mapping apparatus for iterated transform decode picture as the first embodiment of this invention.

In FIG. 2, the texture mapping apparatus for repetitive transform decode picture is caused to be of configuration including a decode/multiplexing isolation (separation) unit 1 for isolating (separating) multiplexed code word into respective code words to separately carry out decoding operation, a repeat transform decoding unit 20 for implementing repeat transform decoding to picture data which has been caused to undergo repeat transformn encoding (e.g., fractal encoding) while implementing scaling thereto, a buffer section 9 for temporarily preserving decode picture from the repeat transform decoding section 20, a shape information calculating section 12 for implementing scaling to shape of object to calculate scaled shape of object, a picture mapping section 10 for implementing mapping to decode picture from the buffer section 9 with respect to the scaled shape of the object obtained from the shape information calculating section 12, and a mapping control section 11 operative to output a control signal for controlling scaling and mapping. Further, as occasion demands, there is provided a display unit 13 for displaying mapped picture finally obtained from the picture mapping section 10.

The repeat transform decode section 20 is caused to be of configuration comprising a transform original block reproducing section 2 for reproducing transform original block on the basis of block No. from the decode/multiplexing isolation (separation) sectional 1 to reproduce a block located at a predetermined position, a scaling section 3 for carrying out scaling of block in accordance with external signal, initial (initialization) picture input section 4 for delivering initial (initialization) picture, a picture transform/generation section 6 for implementing a predetermined transform processing to block picture by using transform parameter from the decode/multiplexing isolation unit 1, a picture memory section 7 for storing, by one picture, transformed block picture, a control section 8 for controlling the number of executions of the decode loop, and a switch 5 for selecting initialization picture or decode picture within loop.

The operation thereof will now be described.

In FIG. 2, code word 100 obtained after undergone repeat transform encoding is inputted to decode/multiplex isolation (separation) unit 1 in the multiplexed state. The decode/ multiplex isolation (separation) unit 1 allows the multiplexed code word 100 to undergo multiplex-separation to further carry out decoding thereof every separated or isolated code words. Ordinarily, for reduction of quantity of bits to be encoded and convenience of data handling, in the encoder corresponding to this decoder, code words are multiplexed to send multiplexed code word from the encoder. However, in the case where the encoder does not take a form to multiplex code words to send out it for the structural requirement of the equipment, this decode/ multiplex isolation unit 1 may be omitted. Block No. 101 of block picture which has been subjected to multiplex-separation (isolation) and has been decoded and conversion (transform) parameter 102 are outputted from the decode/ multiplex isolation unit 1. Block No. 101 is inputted to transform source block reproducing section 2. In this case, the transform original block reproducing section 2 calculates position of block within the entirety of the picture from the block No. 101 to output block position information 104 as the result thereof. The block position information 104 is inputted to the scaling section 3. Thus, the scaling section 3 carries out scaling of block position information 104 on the basis of scaling information 115 outputted from mapping control section 11 which will be described later.

For example, in the case where it is assumed that block position information 104 has information of position coordinates $A(X_A, Y_A)$, $B(X_B, Y_B)$, $C(X_C, Y_C)$ and $D(X_D, Y_D)$ of four points which are information sufficient for representing position of block, and scaling information 115 indicates magnification of R, scaled block position information 105 will have information of position coordinates $A'(RX_A, RY_A)$, $B'(RX_B, RY_B)$, $C'(RX_C, RY_C)$ and $D'(RX_D, RY_D)$ of new four points.

The picture transform/generating section 6 is supplied with scaled block position information 105 and conversion (transform) parameter 102, and is supplied with initialization picture or decode picture within the loop from switch 5. The picture transform/generating section 6 carries out predetermined transform processing such as rotation, translation, enlargement or contraction with respect to block picture located at the position indicated by block position information to generate transformed (converted) block picture 109 to output it. In this example, the switch 5 is switched so as to deliver, at first, initialization (initial) picture from the initial (initialization) picture input section 4 to the picture transform generating section 6 when repeat transform decoding is started to deliver, at times subsequent thereto, decode picture within the loop to the picture transform generating section 6. Initial picture from the initial picture input section 4 may be arbitrary picture. This is because the property that "even if repeat transform decoding is started, picture of destination of convergence is the same" which is the feature of the repeat transform decoding operation is utilized.

More practical example of transform processing will be described in detail.

The above-described operation is executed with respect to picture ofone screen. After block picture 109 of one screen is stored/held at picture memory section 7, transform picture 110 is inputted to control section 8. As indicated by this example, the control section 8 is located at terminal of the decoding loop and serves to count the number of executions of the decode loop. Further, at the time point when the number of executions reaches a predetermined value, decode operation at this decode loop is completed. Namely, in the case where decoding operation is continued within the decode loop, decode picture is outputted from the control section 8 as intra-loop transform picture 108, and is inputted to the switch 5. On one hand, in the case where decode loop is completed by the above-described operation, decode picture is inputted to the buffer section 9 as decode picture 111.

In a manner stated above, the portion corresponding to decoding in this apparatus, i.e., iterated transform decoding section 20 has been described.

The texture mapping unit of decode picture will now be described.

Decode picture 111 stored/held at the buffer section 9 is read out and outputted as decoded picture 112 in accordance with data read-out designation signal 113 from the mapping control section 11. With respect to mapping designation signal 114 at this time, this signal is outputted at the time when in the case where this apparatus is connected to another unit, etc., the content of control signal 118 is decoded at mapping control section 11 which has received control signal 118, e.g., from the external to carry out operation for sending out predetermined control signals to respective sections constituting this apparatus. Shape information 117 of the object is inputted from the external to shape information calculating section 12. When data read-out designation signal 113 is transmitted to the shape information calculating section 12, shape information 117 is re-calculated on the basis of the above-described scaling information 115. Thus, new shape information 116 is outputted to the picture mapping section 10. At the buffer section 9 which has received the data read-out designation signal 113, it outputs decode picture 112 which has been stored/held to the picture mapping section 10. The picture mapping section 10 which has received mapping designation signal 114 from the mapping control section 11 implements mapping to decoded picture 112 with respect to object shape obtained by developing new shape information 116. Mapping picture 119 obtained at the result thereof is depicted at the display unit 13.

In this example, as the shape information 117 of object in the above-described embodiment, e.g., three-dimensional data of shape of object collected at, e.g., optical reading unit (three-dimensional digitizer) or polygon data, etc. prepared by graphic tool on the computer are conceivable.

The texture mapping to the object shape of picture carried out in the above-described picture mapping section 10 of FIG. 2 will now be described with reference to the attached drawings.

Figure 3:
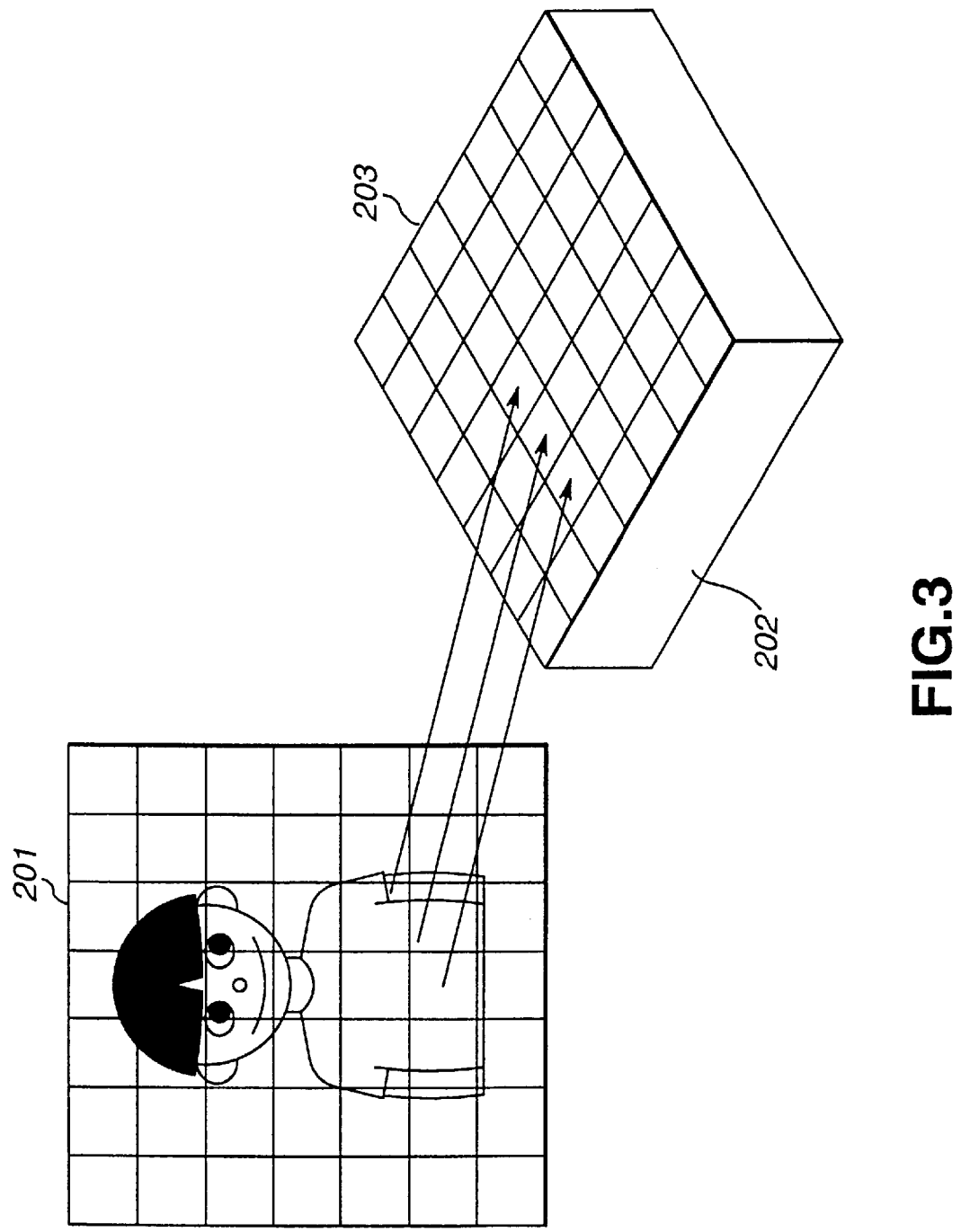
FIG. 3 is a view for explaining an example of the fundamental operation of texture mapping.

Initially, FIG. 3 illustrates outline of typical texture mapping processing and indicates processing in which texture (picture) 201 is mapped (pasted) onto a certain side surface 203 of polygon (polyhedron) 202. It is to be noted that the reason why the texture shown is partitioned by measures of the same spaces (distances) in FIG. 3 indicates the state where texture is mapped onto polygon in pixel units for convenience of explanation.

Figure 4:
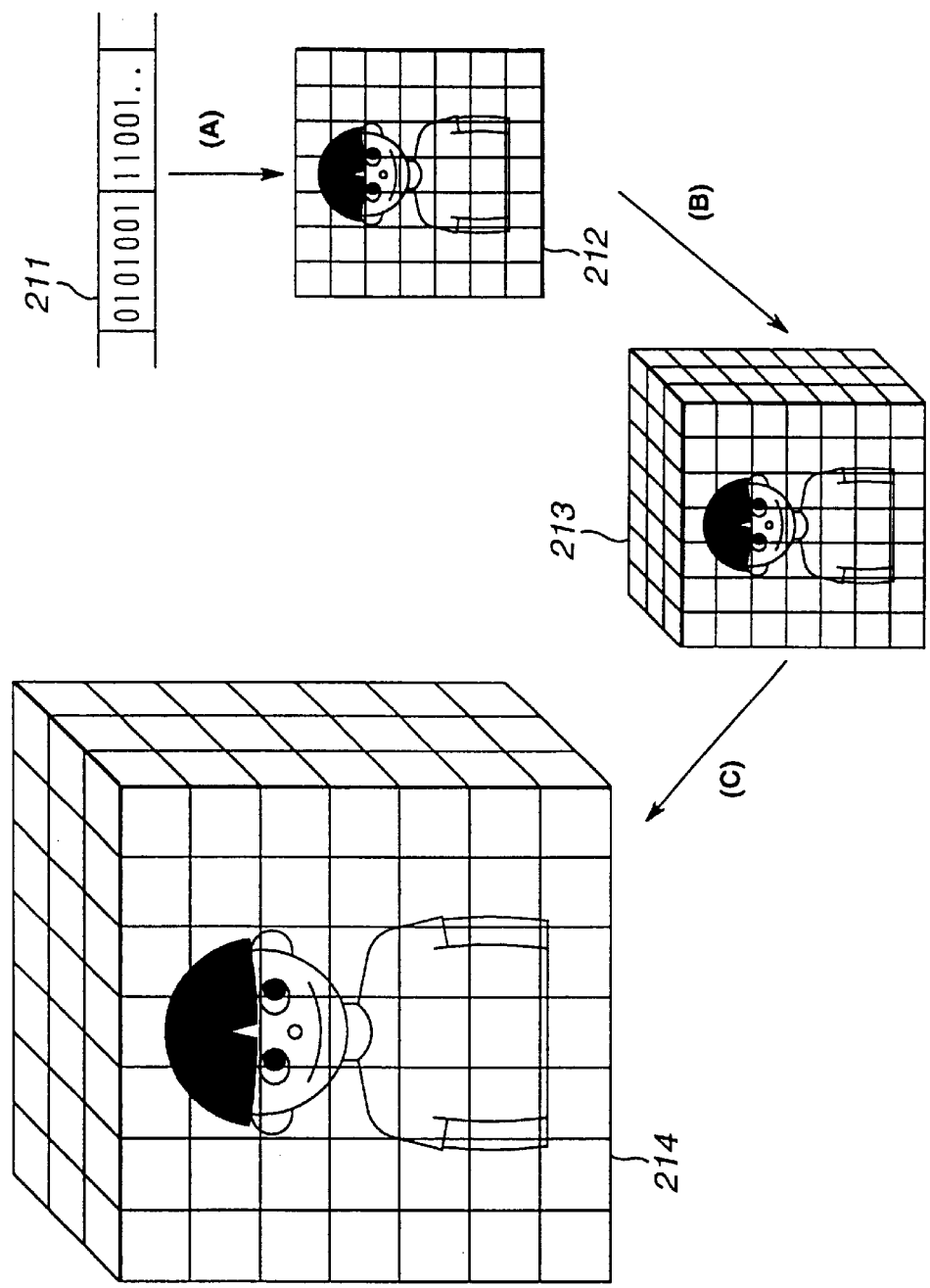
FIG. 4 is a view for explaining an example of texture mapping of decoded picture using conventional technology.

FIG. 4 is a view for explaining texture mapping processing with scaling conventionally known. In this FIG. 4, (A) decoding from encoded bit stream 211 to texture 212 is carried out, (B) this texture 212 is caused to undergo mapping with respect to polygon thus to prepare texture mapped polygon 213, and (C) polygon 213 which has been caused to undergo texture mapping is scaled to prepare scaled polygon 214. As the representative texture of the encoding/decoding techniques for texture used in this example, there is mentioned JPEG. In practice, for compression of texture which serves as source for conventionally carrying out texture mapping, JPEG has been utilized in most cases. The problem of this case is as follows. Since the entirety of polygon which has been caused to first undergo texture mapping is subjected to scaling, particularly pixels newly produced by enlargement are calculated by linear interpolation between pixels of texture. For this reason, texture (disposition) of picture becomes coarse. As a result, degradation of picture becomes conspicuous, or sharpness of picture is lost so that bloomed (obscure) picture would be displayed. In this example, the linear interpolation method between pixels is the technique typically used hitherto.

Moreover, while there has been shown in FIG. 4 the example in which polygon which has been caused to undergo texture mapping is subjected to scaling, even if such an operation is carried out to allow texture which has been caused to undergo scaling to undergo texture mapping in a manner stated above, such an operation is exactly the same as processing of pixel values within picture. There is no difference between texture mapped picture thus obtained.

On the contrary, in the texture mapping apparatus of iterated transform decoded picture shown in FIG. 2 as the first embodiment of this invention, texture which has been subjected to repetitive transform encoding (particularly, block in the case of this embodiment) may be caused to undergo iterated transform decoding while implementing scaling thereto to carry out mapping of decoded picture with respect to polygon which has been subjected to scaling.

Figure 5:
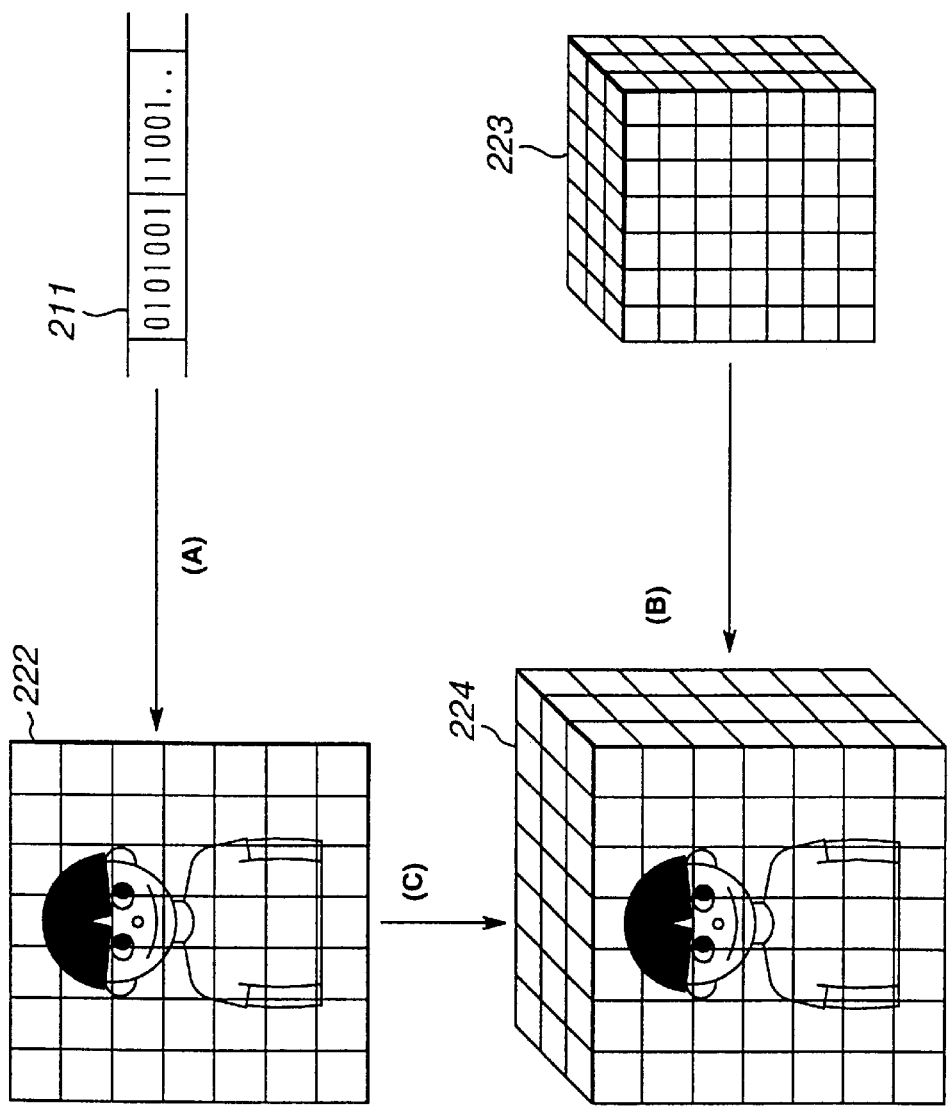
FIG. 5 is a view for explaining an example of texture mapping of decoded picture according to the embodiment of this invention.

Namely, in FIG. 5, such an approach is employed to read bit stream 211 of code words of texture which has been caused to undergo repeat transform encoding (A) to carry out iterated transform having a function to make iterated transform decoding while scaling its texture which has been caused to undergo repeat transform encoding to restore texture 222. Moreover, (B) polygon 223 is caused to undergo scaling (C) to implement mapping to restored texture 222 while scaling as described above with respect to the polygon which has been subjected to scaling to thereby obtain polygon 224 which has been subjected to scaling. In this case, decoded picture obtained as the result of the above-described operation of (A) is one restored by iterated transform decoding up to 1 pixel level. Accordingly, this operation is characterized in that resolution is high and picture quality is satisfactory as compared to picture generated by linearly interpolating JPEG picture.

The fundamental operation of the first embodiment has been described above. In accordance with the first embodiment, since mapped picture is picture decoded at the same time while carrying out scaling by iterated transform decoding. Accordingly, even in the case where scaling is zooming, the feature that decoded picture can be restored without depending upon resolution, which is the feature of iterated transform decoding is exhibited and degradation of picture is advantageously reduced to much degree as compared to the conventional system. Further, since "zooming+ repetitive transform decoding" and "zooming of object shape" can be processed in parallel, the processing advantageously carried out at high speed.

In this case, the fundamental theory of repetitive transform encoding/decoding which is one of the fundamental technologies of the embodiment of this invention will now be described with reference to FIG. 6.

This technique is a technique such that, in the repetitive transform (converting) encoding, ordinarily contraction mapping from domain block to range block is repeatedly carried out with respect to all range blocks constituting the picture to thereby carry out picture encoding. At this time, it is sufficient to encode position information of domain block and/or transform parameter of domain block most approximate to respective range blocks.

Figure 6:
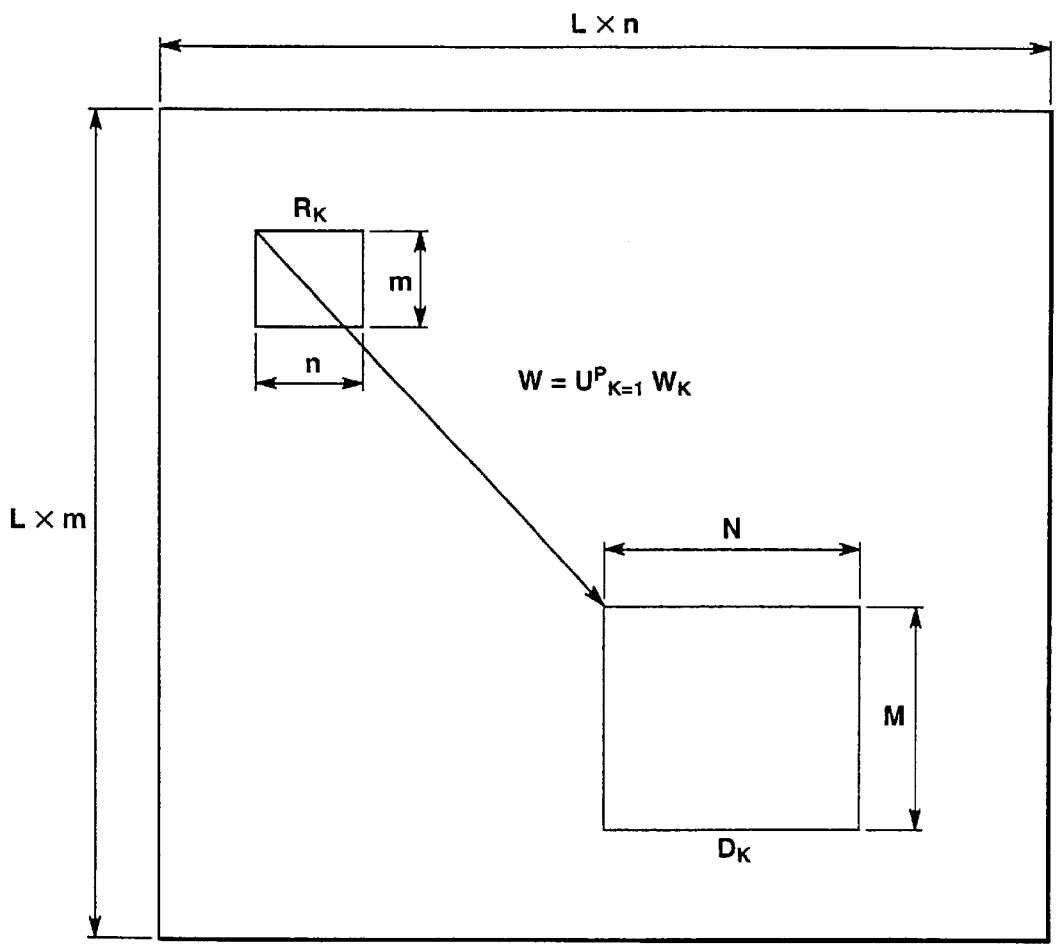
FIG. 6 is a view indicating mapping transform between blocks.

In FIG. 6, $R_k$ corresponds to range block and $D_k$ corresponds to domain block. In this case, block size of $R_k$ is caused to be m×n and block size of $D_k$ is caused to be M×N. In FIG. 5, it is demonstrated that L×L number of range blocks exist. The block sizes of the range block and the domain block are factors greatly influenced with respect to encoding efficiency. Accordingly, determination of size is important.

Moreover, block picture transform at the picture transform/generation section 6 is the transform from $D_k$ to $R_k$. When mapping function to block k is assumed to be $w_k$ and the number of blocks of domain block required for carrying out mapping transform of the entirety of picture is assumed to be P, picture f is mapped by the mapping function W of the entirety of picture which is expressed as follows:

$$W(f)=w_1(f) \cup w_2(f) \cup \ldots \cup w_P(f) \qquad (1)$$

Accordingly, W is expressed by the following formula.

$$W=\cup^P_{k=1} w_k \qquad (2)$$

In this case, as the above-described mapping function w, any functions may be employed even if they are converged. There are many instances where contraction (reduction) mapping may be typically used for the purpose of ensuring convergence. Further, Affine transform may be frequently used for simplification of processing. When the case where $D_k$ is mapped into $R_k$ by the Affine transform is formalized with actual transform function being as vi, the following formula is provided.

$$vi(x, y) = \begin{bmatrix} a_i & b_i \\ c_i & d_i \end{bmatrix} \begin{bmatrix} x \\ y \end{bmatrix} + \begin{bmatrix} e_i \\ f_i \end{bmatrix} \qquad (3)$$

By this formula (3), transform operations such as rotation, translation, contraction (reduction) and enlargement between two blocks can be all represented. At the picture transform generating section 6, e.g., circuits for carrying out rotation, translation, reduction and/or enlargement, etc. indicated by the formula (3) are included to implement transform processing by using transform parameter 102 of the formula (3) to thereby obtain block picture 109 after undergone transform operation. In FIG. 6, there is shown the state where $D_k$ which is at the right and lower portion of picture on screen is caused to undergo mapping transform with respect to $R_k$ at the left and upper portion of the picture.

The texture mapping apparatus for repetitive transform decoding picture which is the second embodiment of this invention will now be described with reference to FIG. 7.

Figure 7:
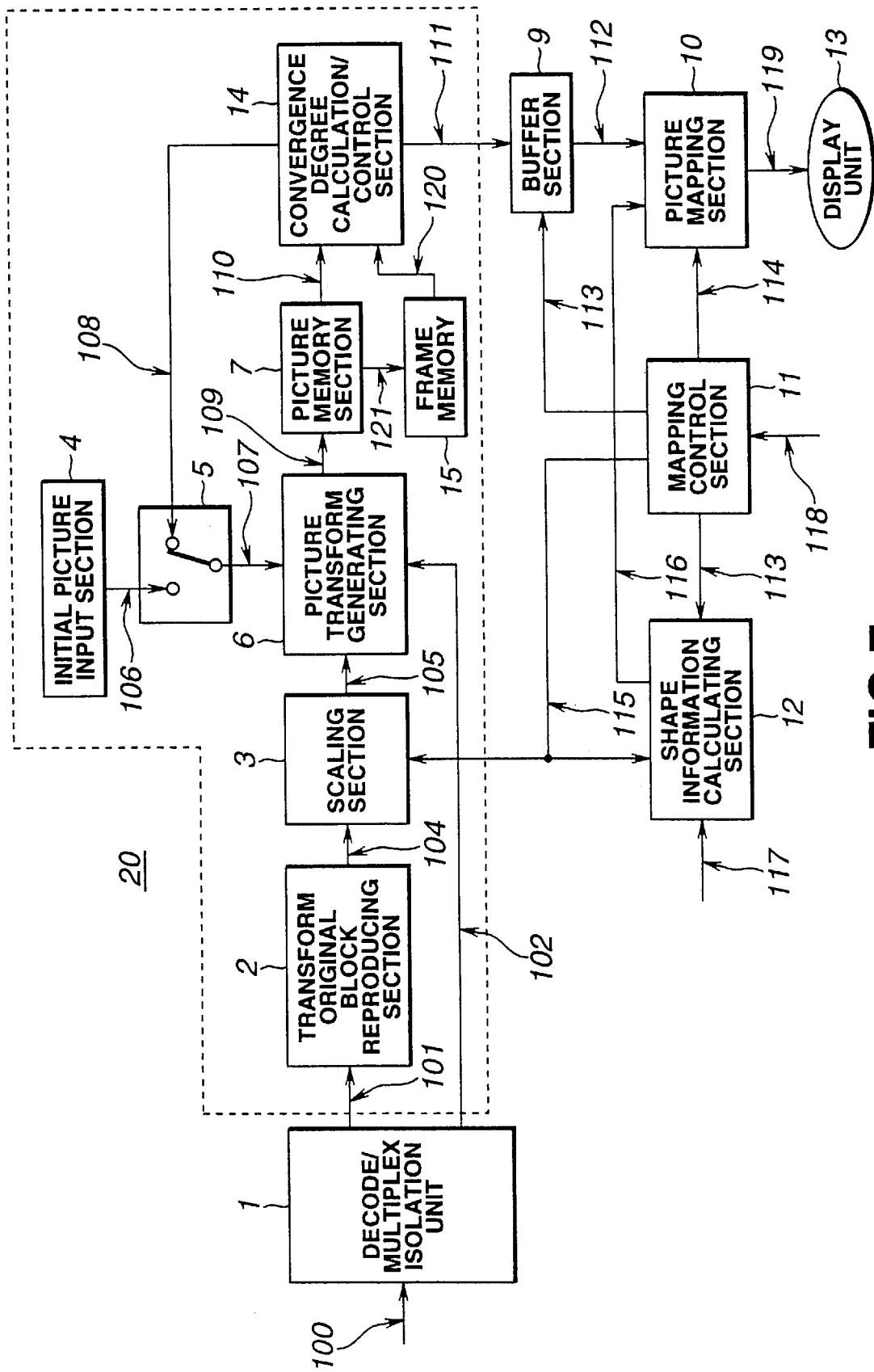
FIG. 7 is a block diagram showing the configuration of a texture mapping apparatus for repetitive transform decode picture which is a second embodiment of this invention.

The texture mapping apparatus for iterated transform decode picture which is the second embodiment shown in FIG. 7 is caused to be of configuration including decode/multiplexing isolation (separation) unit for isolating (separating) multiplexed code word into respective code words to separately carry out decoding operations, iterated transform decoding section 20 for carrying out iterated transform decoding while implementing scaling to picture data which has been caused to undergo iterated transform encoding, buffer section 9 for temporarily preserving finally obtained decoded picture, shape information calculating section 12 for implementing shape of object to calculate scaled shape of the object, picture mapping section 10 for implementing mapping to decoded picture from the buffer section 9 with respect to the object having scaled shape, which has been obtained from the shape information calculating section 12, and mapping control section 11 operative to output a control signal for controlling scaling and mapping. Further, as occasion demands, there is provided display unit 13 for displaying the mapped picture finally obtained from the picture mapping section 10.

The iterated transform decoding section 20 is caused to be of configuration including transform source block reproducing section 2 for reproducing transform source block on the basis of the block No. from the decode/multiplexing isolation (separation) unit 1 to reproduce block located at a predetermined position, scaling section 3 for carrying out scaling of block in accordance with an external signal, an initial picture input section 4 for supplying initial picture, picture transform (conversion/generating section 6 for implementing a predetermined transform processing to block picture by using transform parameter from the decode/multiplexing isolation (separation) unit 1, picture memory section 7 for storing block picture after undergone transform operation by one picture, a frame memory 15 for storing/holding decoded picture before one loop, a conversion degree calculation/control section 14 for calculating degree of convergence of decoded picture to carry out control of the decode loop, and switch 5 for selecting initial picture or decoded picture within the loop.

The operation of the second embodiment shown in FIG. 7 will now be explained. Since the fundamental operation of this second embodiment is similar to the operation of the first embodiment of FIG. 2, explanation of its fundamental operation is omitted.

In FIG. 7, block picture 109 after transform corresponding to one picture is stored or held at the picture memory section 7, and decoded picture 121 is then outputted to the frame memory 15. The frame memory 15 holds decode picture 121 only for a time period of one loop until execution of the next decode loop is started. Further, at the convergence degree calculation/control section 14, decoded picture 110 of current loop and decoded picture 120 of previous loop which has been read out from the frame memory 15 are compared to measure degree of convergence of decoded picture. As a result, in the case where degree of convergence satisfies a predetermined condition, (execution of) the decode loop is completed to output final decoded picture 111. When the above-described operation is formalized, the following relational expression is provided:

if $(|dec(n)-dec(n-1)|/dec(n)<Th)$ then
  {Completion of decode loop}
else
  {start of next decode loop}

In this case, dec (n) indicates decoded picture at the time of the n-th decode loop, and Th indicates threshold value of degree of convergence for completing the decode loop.

In accordance with the second embodiment, degree of convergence of decode picture is calculated to complete (execution of) the decode loop when (the degree of) convergence reaches a predetermined level so that decoded picture can be outputted. Accordingly, it is advantageously provided to shorten processing time in the case where convergence is fast in addition to the advantage that the first embodiment has.

A texture mapping apparatus for iterated transform decode picture which is the third embodiment of this invention will be described with reference to FIG. 8.

Figure 8:
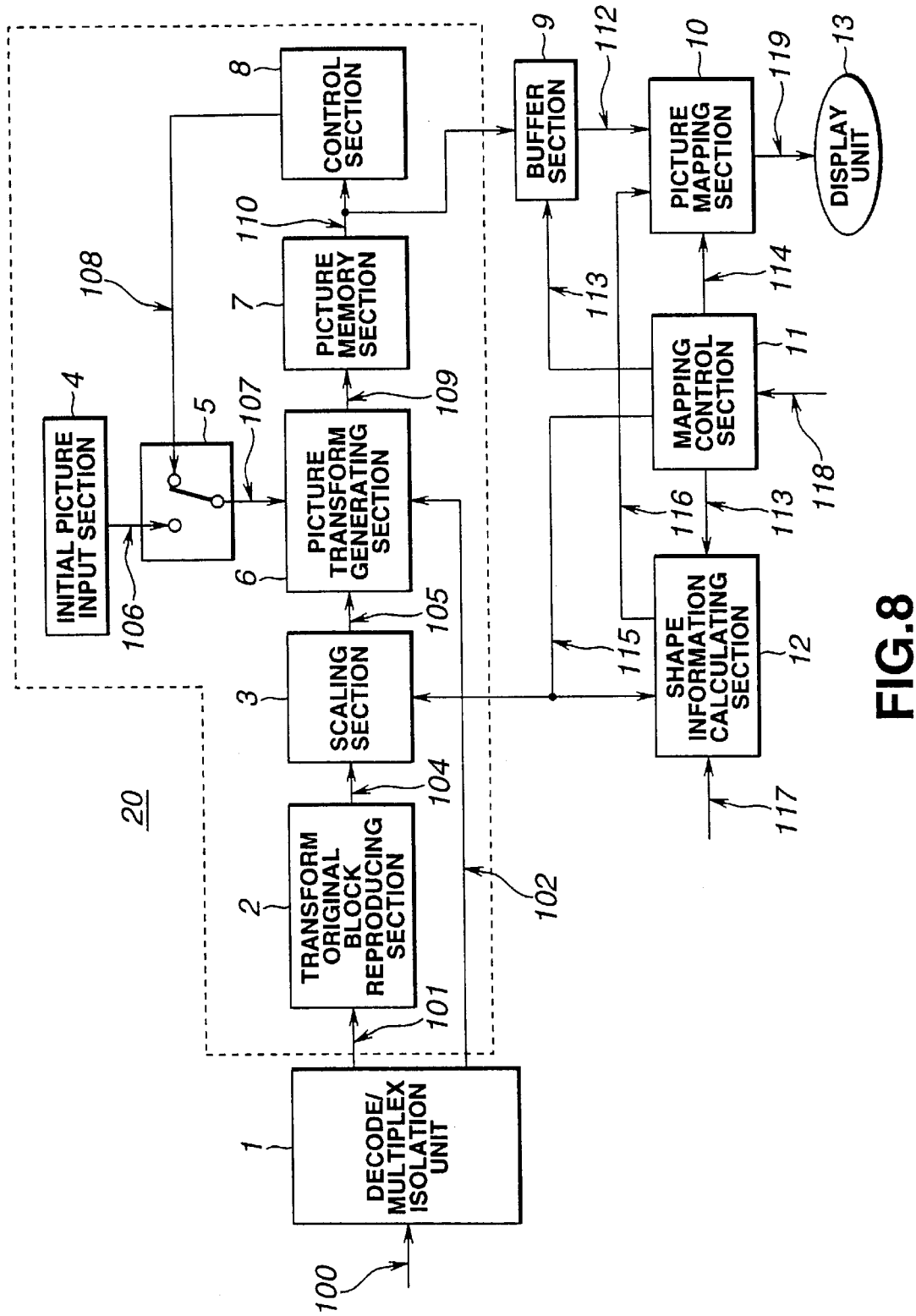
FIG. 8 is a block diagram showing the configuration of a texture mapping apparatus for repetitive transform decode picture which is a third embodiment of this invention.

Respective components constituting the texture mapping apparatus for iterated transform decode picture of the third embodiment shown in FIG. 8 are similar to those of the above-described first embodiment of FIG. 2. The embodiment of FIG. 8 differs from the first embodiment in that decode picture from the iterated transform decoding portion 20 is taken out from the picture memory section 6.

Namely, in the texture mapping apparatus for iterated transform decode picture shown in FIG. 8, decoded picture outputted from the picture memory section 6 of the iterated transform decoding section 20 is directly sent to the buffer section 9 to thereby output decoded pictures obtained within the decoding loop to the picture mapping section 10 through the buffer section 9 every respective executions of the loop to apply texture mapping to object shape.

The operation of the third embodiment will now be described. In this case, since the fundamental operation of the third embodiment is similar to the above-described first embodiment of FIG. 2, its fundamental operation will be omitted.

Decode picture 110 which has been read out from the picture memory section within the decode loop at the iterated transform decoding section 20 of FIG. 8 is outputted to the control section 8 and is directly inputted to the buffer section 9. The buffer section 9 which has received data read-out designation signal 113 outputs stored/held decoded picture 112 to the picture mapping section 10. The picture mapping section 10 which has received a mapping designation (indication) signal 114 from the mapping control section 11 carries out the mapping of the decoded picture 112 with respect to shape of object obtained by developing shape information 116. Mapped picture 119 obtained as the result thereof is depicted (displayed) at the display unit 13.

In the third embodiment shown in FIG. 8, decoded picture obtained within decode loop is occasionally outputted to the buffer section 9, at which it is stored/held. Further, the decoded picture is subjected to texture mapping in accordance with data read-out designation signal 113 so that object shape is provided. Accordingly, unlike the first embodiment of FIG. 2 in which no texture mapping has been carried out until the decode loop is completed, there is taken progressive display form in which mapped picture of decoded pictures updated at respective decode loops are displayed. This is very effective because picture caused to undergo texture mapping of decode picture is displayed from the first, e.g., in the case where it takes much time until decoded picture is converged within the decoded loop. For example, when this progressive display form is applied to the environment where line speed is low like so-called Internet, etc., since the process is displayed, it is lessened that the degree of impatience or feeling of disagreement by wait (standby) time is given to user. This is advantageous.

The texture mapping apparatus for iterated transform decoding picture which is the fourth embodiment of this invention will now be explained with reference to FIG. 9.

Figure 9:
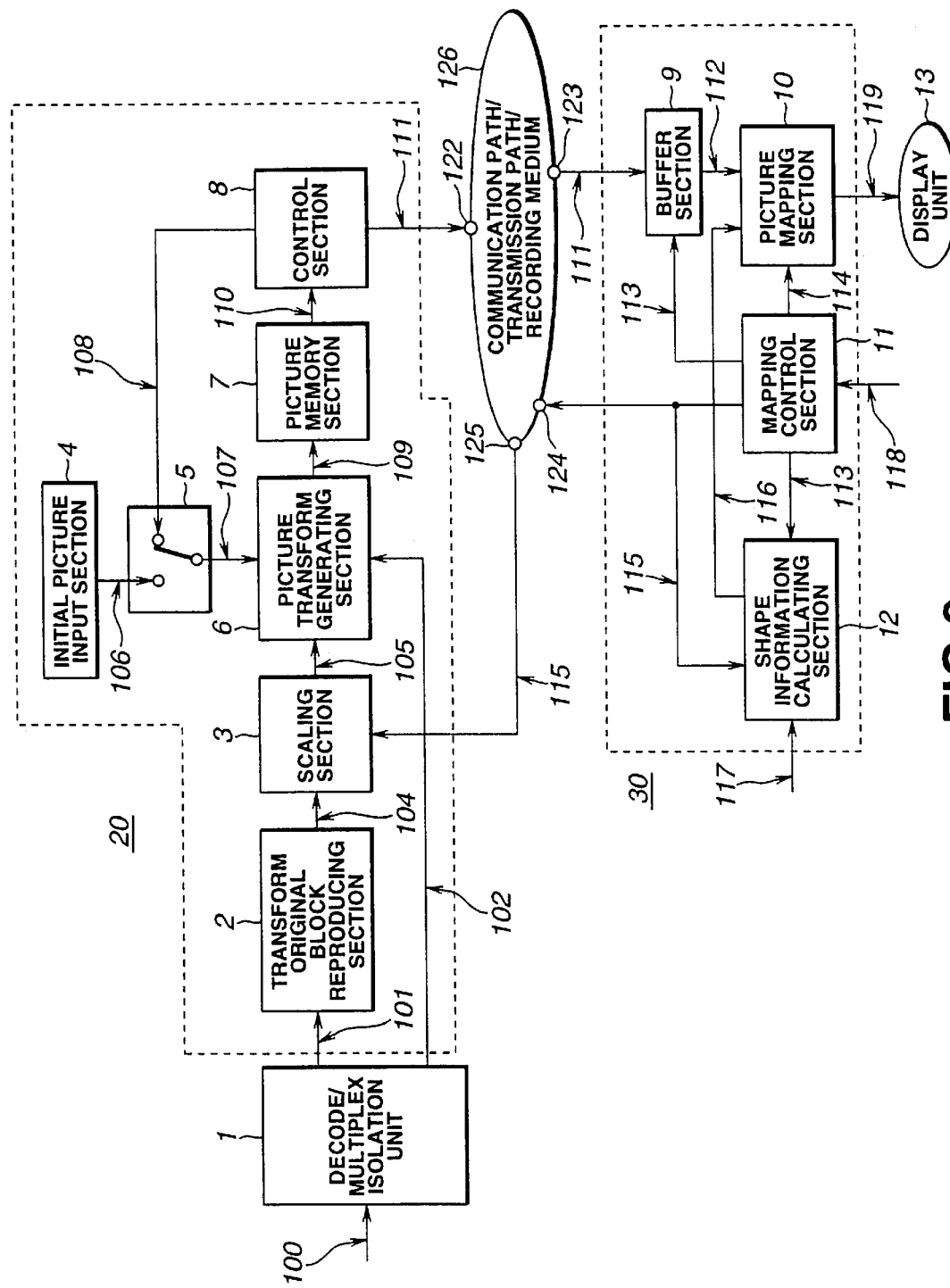
FIG. 9 is a block diagram showing the configuration of a texture mapping apparatus for repetitive transform decode picture which is a fourth embodiment of this invention.

The fundamental configuration of the texture mapping apparatus for iterated transform decode picture of the fourth embodiment shown in FIG. 9 is similar to the above-described first embodiment of FIG. 2. In the example of FIG. 9, iterated transform decoding section 2D and other portions (circuit components) are connected through communication path/transmission path/recording medium 126. Namely, the texture mapping apparatus for iterated transform decode picture of the fourth embodiment shown in FIG. 9 includes decode/multiplexing isolation (separation) section 1 for isolating (separating) multiplexed code word into respective code words to separately carry out decoding, iterated transform decoding unit 20 for carrying out repetitive decoding while implementing scaling to the picture data which has been caused to undergo iterated transform encoding, and a texture mapping unit 30 for mapping decoded picture so that shape of object which has been caused to undergo scaling is taken; and the iterated transform decoding unit 20 and the texture mapping unit 30 are connected through the communication path, the transmission path or the recording medium 116.

The repetitive transform decoding unit 20 comprises transform source block reproducing section 2 for reproducing transform original block on the basis of block No. from the decode/multiplexing separation unit 1 to reproduce block located at a predetermined position, scaling section 3 for carrying out scaling of block in accordance with an external signal, picture transform generating section 6 for implementing predetermined transform processing to block picture by using transform parameter from the decode/multiplexing isolation (separation) unit 1, picture memory section 7 for storing, by one picture, block picture after undergone transform operation, control section 8 for controlling the number of executions of decode loop, and switch 5 for selecting initial picture or decode picture within the loop. Moreover, the texture mapping unit 30 comprises buffer section 9 for temporarily preserving decode picture finally obtained, shape information calculating section 12 for implementing scaling to shape of object to calculate scaled object shape, a picture mapping section 10 for implementing mapping to decode picture from the buffer section 9 with respect to scaled shape of object obtained from the shape information calculating section 12, and mapping control section 11 operative to output a control signal for controlling scaling and mapping, and mapped picture finally obtained by the texture mapping unit 30 is delivered to the display unit 13, and its picture is displayed thereon. By such a configuration, the texture mapping apparatus for repetitive transform decoding picture which serves as the fourth embodiment is constituted.

In this case, the communication path/transmission path/recording medium 126 takes any one of communication path, transmission path and recording medium, and may be recording medium, such as, for example, CD-ROM, CD-R, DVD-ROM, hard disc, etc. in addition to transmission path such as existing telephone line (circuit), ISDN (Integrated Service Digital Network), wireless line (circuit), private line, or so called Internet, etc. This communication path/transmission path/recording medium 126 includes an input terminal 122 for decoded picture 111 outputted from the control section 8 within the repeat (repetitive) decoder, and an output terminal 123 to buffer section 9 of the texture mapping apparatus. In addition, the communication path/transmission path/recording medium 126 has an input terminal 124 for scaling information 115 outputted from the mapping control section 11 within the texture mapping apparatus, and an output terminal 125 to the scaling section 3 of the repetitive decoder.

It is to be noted while, in the example of the fourth embodiment shown in FIG. 9, for convenience of explanation, while input/output terminals of transfer of signal are separated by two pairs (i.e., 122 and 123, 124 and 125) on the communication path/transmission path/recording medium 126, it is obvious that signals are passed through the same route (path) at the actual communication path/transmission path/recording medium 126.

The fundamental operation of the fourth embodiment is similar to the above-described first embodiment which has been explained along with FIG. 2. In the fourth embodiment, the case where the iterated transform decoding unit and the texture mapping unit are connected in the state separately spaced through the communication path, the transmission path and the recording medium is assumed. In addition, decoded picture obtained by the iterated transform decoding unit is recorded onto recording medium such as CD-ROM, etc., and is read out directly or through the transmission path and the transmission path, thus making it possible to realize such function by similar configuration also in the case of carrying out texture mapping.

Since it is sufficient for the apparatus of the fourth embodiment to separately have the iterated transform decoder and the texture mapping unit, reduction of hardware and effective utilization of resource on the network can be realized.

The texture mapping apparatus for iterated transform decode picture which is the fifth embodiment of this invention will now be described with reference to FIG. 10.

Figure 10:
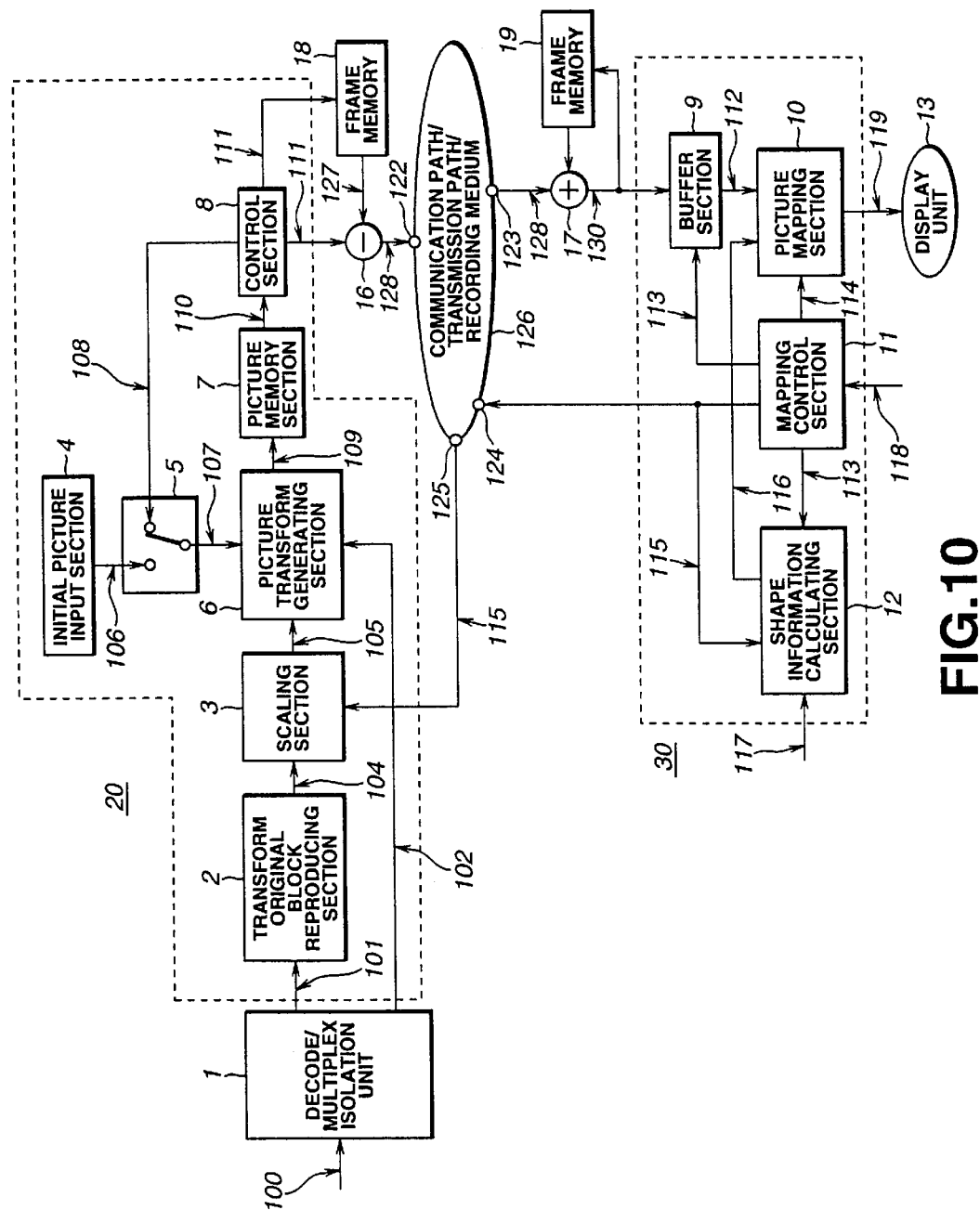
FIG. 10 is a block diagram showing the configuration of a texture mapping apparatus for repetitive transform decode picture which is a fifth embodiment of this invention.

The fundamental configuration of the texture mapping apparatus for the iterated transform decode picture of the fifth embodiment shown in FIG. 10 is similar to the above-described first embodiment of FIG. 2 and the above-described fourth embodiment of FIG. 9. On the contrary, the example of the FIG. 10 is different from those embodiments in that difference of decoded picture output from the iterated transform decoding unit 20, e.g., frame difference is taken to send it to the communication path/transmission path/recording medium 126, and comprises frame memories 18, 19 at the transmitting/receiving side of decoded picture which is subjected to transmission through the communication path/transmission path/recording medium 126 to transmit or receive difference picture of decoded picture to carry out texture mapping.

Namely, decoded picture 111 finally outputted after completion of execution of the decode loop is inputted from the control section 8 of the iterated transform decoding unit 20 to the difference element 16, and is stored/held into the frame memory 18. Further, at the difference element 16, difference between current decode picture 111 and decode picture 127 already stored/held at the frame memory 18 is taken to output its difference picture 128 to the input terminal 122 of the communication path/transmission path/recording medium 126. On one hand, the difference picture 128 is sent out from output terminal 123 of the communication path/transmissions path/recording medium 126 and is inputted to an adder 17. At the adder 17, addition of decode picture 129 already stored/held at the frame memory 19 and difference picture 128 is carried out to output the decoded picture 130 thus obtained to the buffer section 9, and to output such decode picture to the frame memory 19 for a second time to store and hold it. The processing except for the above is similar to the already described processing.

The fifth embodiment is caused to be of configuration capable of coping with texture mapping for iterated transform decode picture of moving picture. Namely, at the iterated transform decoding section 20, encoded bit streams 100 obtained by allowing moving picture to undergo iterated transform encoding are read in succession in frame units to obtain decode picture by the above-described operation. Further, difference picture with respect to decoded picture of previous frame obtained at the difference element 16 is sent to the communication path/the transmission path/recording medium 126. Accordingly, this embodiment is characterized in that quantity of information of decode picture caused to undergo transmission can be reduced to much degree as compared to the technique shown in the above-described fourth embodiment of FIG. 9.

Figure 11:
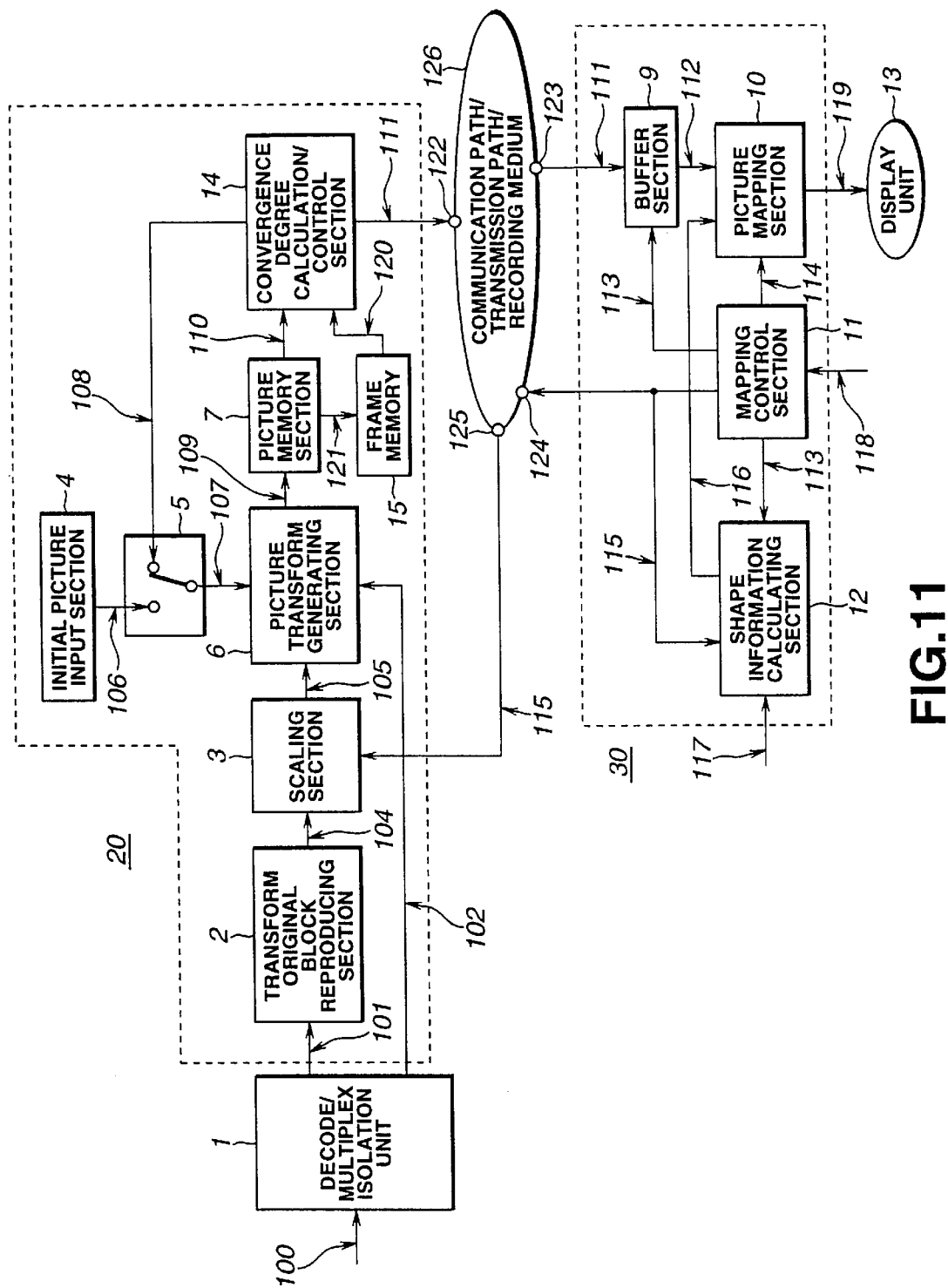
FIG. 11 is a block diagram showing the configuration of a texture mapping apparatus for repetitive transform decode picture which is a sixth embodiment of this invention.

Further, FIG. 11 is a block diagram showing an example of a texture mapping apparatus for iterated transform decode picture which is the sixth embodiment of this invention. The texture mapping apparatus for iterated transform decode picture of the sixth embodiment shown in FIG. 11 includes decode/multiplexing isolation (separation) unit 1 for isolating (separating) multiplexed code word into respective code words to separately carry out decoding, a iterated transform decoding unit 20 for carrying out repetitive transform (converting) decoding while implementing scaling to picture data which has been caused to undergo iterated transform encoding, and a texture mapping unit 30 for mapping the decoded picture so that scaled shape of object is provided, and the iterated transform decoding unit 20 and the texture mapping unit 30 are connected through communication path, transmission path or recording medium 116.

The iterated transform decoding section 20 comprises conversion source block reproducing section 2 for reproducing transform source block on the basis of block No. from the decoding/multiplexing isolation (separation) section 1 to reproduce block at a predetermined position, scaling section 3 for carrying out scaling of block in accordance with external signal, picture transform/generating section 6 for implementing a predetermined transform processing to block picture by using transform parameter from the decode/multiplexing isolation (separation) section 1, picture memory section 7 for storing, by one picture, block picture after undergone transform, a frame memory 15 for storing/holding decoded picture before one loop, a convergence degree calculating/controlling section 14 for calculating degree of convergence of decoded picture to carry out control of decode loop, and switch 5 for selecting initial picture or decoded picture within the loop. Moreover, the texture mapping section 30 comprises buffer section 9 for temporarily preserving finally obtained decode picture, a shape information calculating section 12 for implementing scaling to shape of object to calculate scaled shape of object, and picture mapping section 10 for mapping decoded picture from the buffer section 9 so that scaled shape of object obtained from the shape information calculating section 12 is provided, and mapped picture finally obtained by the texture mapping section 30 is delivered to the display unit 13 and its picture is displayed thereon. By such a configuration, the texture mapping apparatus (unit) for iterated transform decode picture which is the sixth embodiment is constituted.

The operation at the iterated transform decoding unit 20 of the sixth embodiment is the same as the operation of the iterated transform decoding section 20 of the above-described second embodiment of FIG. 7, and decoded picture 111 which is output of the convergence degree calculation/control section 14 of the iterated transform decoding section 20 is inputted from input terminal 122 of the communication path/transmission path/recording medium 126 to send it to output terminal 123 of the communication path/transmission path/recording medium 126 to the buffer section 9 of the texture mapping unit 30.

On the other hand, scaling information 115 which is output signal from the mapping control section 11 is inputted from input terminal 124 of the communication path/transmission path/recording medium 126 to output it to scaling section 3 of the iterated transform decoder from output terminal 125 of the communication path/transmission path/recording medium 126.

In accordance with the sixth embodiment, processing time can be advantageously shortened in the case of picture in which convergence is fast similarly to the above-described second embodiment, and the effect/advantage such as reduction of hardware or effective utilization of resource on the network, etc. can be obtained.

Figure 12:
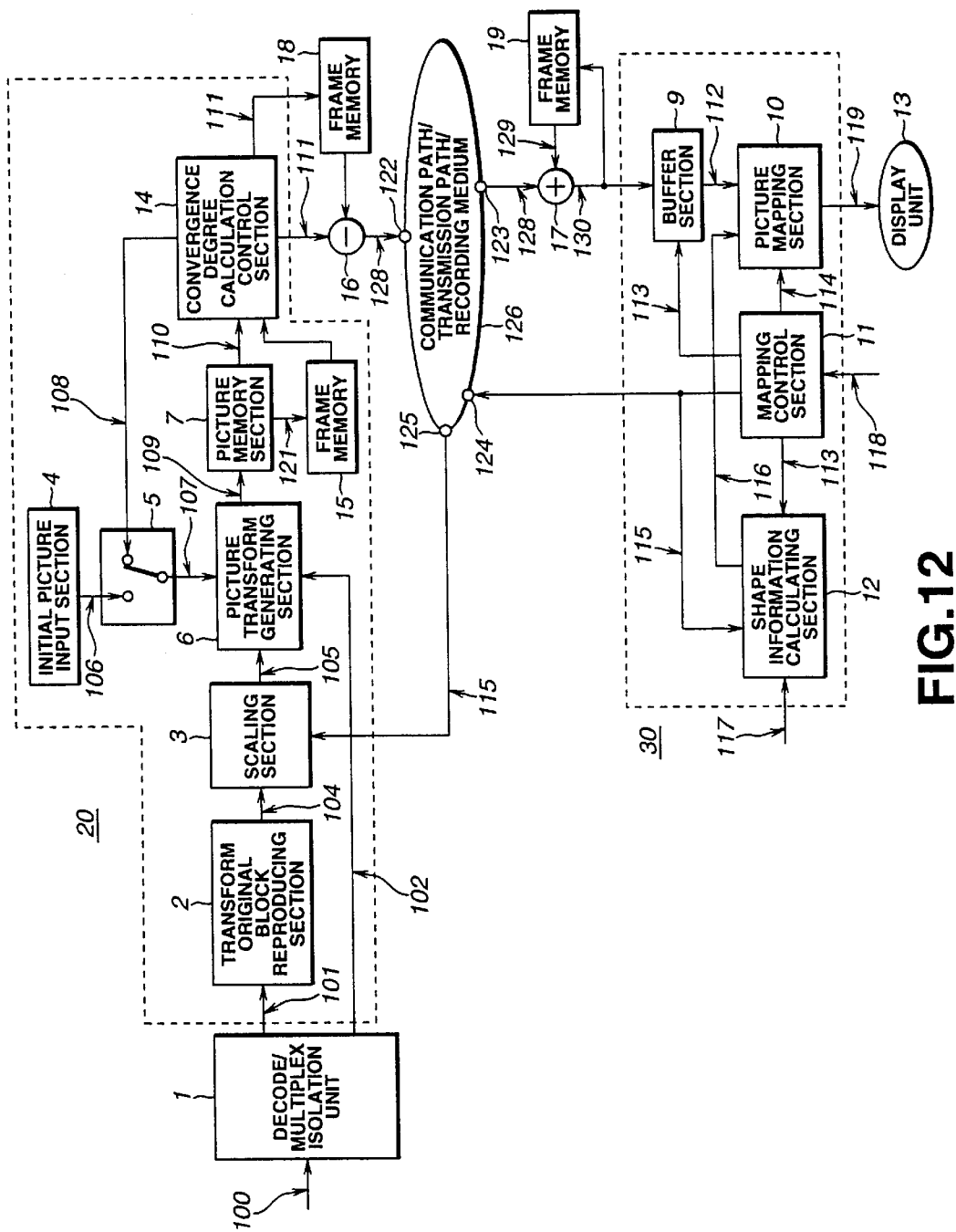
FIG. 12 is a block diagram showing the configuration of a texture mapping apparatus for repetitive transform decode picture which is a seventh embodiment of this invention.

FIG. 12 is a block diagram showing an example of a texture mapping apparatus for iterated transform decode picture which is the seventh embodiment of this invention.

The configuration of the seventh embodiment shown in FIG. 12 is the configuration that, in the above-described apparatus of the sixth embodiment of FIG. 11, frame memories 18, 19 are respectively provided at both output terminal of the iterated transform decoding unit 20 and input terminal of texture mapping unit 30 to carry out transmission of difference between decoded pictures to thereby have to ability to cope with texture mapping for iterated transform decode picture of moving picture.

In FIG. 12, decoded picture 111 outputted from conversion degree calculation/control section 14 is outputted to a subtracter 16 and a frame memory 18. Further, at the subtracter 16, difference between current decoded picture 111 and decoded picture 127 already stored/held at the frame memory 18 is taken to send its difference picture 128 to send it to input terminal 122 of the communication path/transmission path/recording medium 126.

This difference picture 128 is sent from output terminal 123 of communication path/transmission path/recording medium 126 and is inputted to the adder 17. At the adder 17, addition of decoded picture 129 already stored/held at the frame memory 19 and difference picture 128 is carried out to output the decoded picture 130 thus obtained to the buffer section 9, and to output it to the frame memory 19 for a second time to store/hold it. Since the processing except for the above is similar to the sixth embodiment of FIG. 11 already described, its explanation is omitted.

In this example, frame memory 15 within decode loop, frame memory 18 connected to subtracter 16 outside the decode loop and frame memory 19 connected to the adder 17 in FIG. 12 may be memories having the same configuration/function.

In accordance with the seventh embodiment, in addition to the advantageous/effects of the above-described sixth embodiment of FIG. 11, since difference picture with respect to decoded picture of previous frame obtained at the difference element 16 is sent to the communication path/transmission path/recording medium 126 in a manner as described in the fifth embodiment of FIG. 10, quantity of information of decode picture to be transmitted can be greatly reduced.

Figure 13:
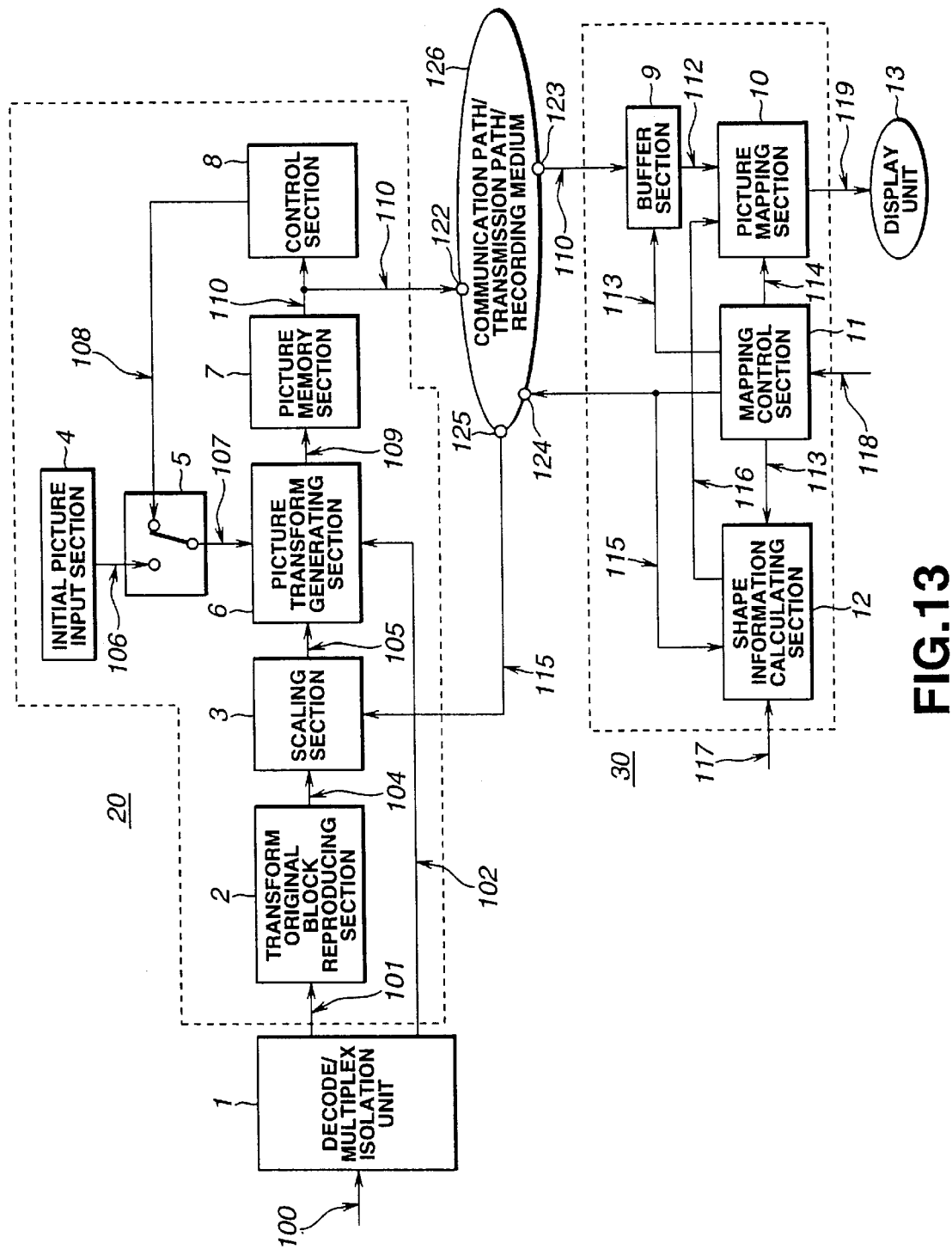
FIG. 13 is a block diagram showing the configuration of a texture mapping apparatus for repetitive transform decode picture which is an eighth embodiment of this invention.

A texture mapping unit (apparatus) for repetitive conversion decoded picture which is the eighth embodiment of this invention will now be described with reference to FIG. 13 The eighth embodiment shown in FIG. 13 is the embodiment in which the above-described third embodiment shown in FIG. 8 and the above-described fourth embodiment shown in FIG. 9 are combined, and the configuration and the operation of the iterated transform decoding section 20 are similar to the iterated transform decoding section 20 of the above-described third embodiment of FIG. 8. Decoded picture 110 within the decode loop which has been read out from the picture memory section 7 of the iterated transform decoding unit 20 of FIG. 12 is inputted from the input terminal 122 of the communication path/transmission path/ recording medium 126 to output it through output terminal 123 of the communication path/transmission path/recording medium 126 to the buffer section 9 of the texture mapping unit 30. On the other hand, scaling information 115 which is output signal from the mapping control section 11 is inputted from input terminal 124 of the communication path/ transmission path/recording medium 126 to output it to the scaling section 3 of the iterated transform decoder from output terminal 125 of the communication path/transmission path/recording medium 126.

In accordance with the eighth embodiment of FIG. 13, this display form is progressive display form in which mapped picture of decoded picture updated at respective decode loops are displayed. Further, it is sufficient to have iterated transform decoding unit 20 and texture mapping unit 30 in the state separately spaced with respect to the communication path/transmission path/recording medium 126. Accordingly, reduction of hardware and effective utilization of resource on the network can be advantageously realized.

Figure 14:
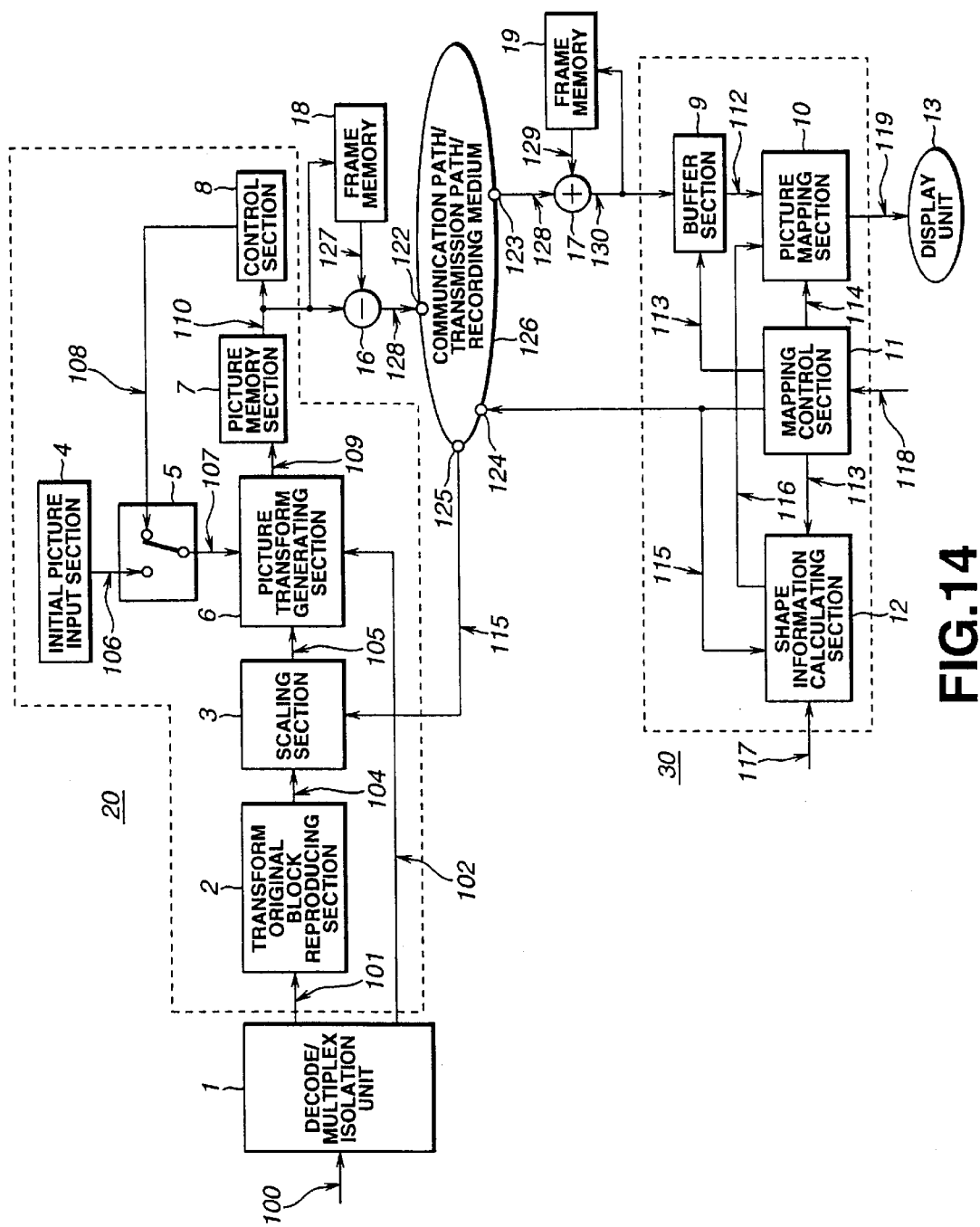
FIG. 14 is a block diagram showing the configuration of a texture mapping apparatus for repetitive transform decode picture which is a ninth embodiment of this invention.

Further, FIG. 14 is a block diagram showing texture mapping apparatus for iterated transform decode picture which is the ninth embodiment of this invention.

The ninth embodiment shown in FIG. 14 is that, in the above-described apparatus of the eighth embodiment shown in FIG. 13, it comprises frame memories 18, 19 respectively at both output terminal of the iterated transform decoding section 20 and the input terminal of the texture mapping section 30 to carry out transmission of difference between decode pictures to have ability to cope with texture mapping of iterated transform decoded picture of moving picture.

In this FIG. 14, decoded picture 110 within the decode loop outputted from the picture memory section 7 is outputted to the subtracter 16 and the frame memory 18. Further, at the subtracter 16, difference between decoded picture 110 within current decode loop and decode picture 127 already stored/held at the frame memory 18 is taken to send this difference picture 128 to the input terminal 122 of the communication path/transmissionpath/ recordingmedium 126. This difference picture 128 is taken out from output terminal 123 of the communication path/ transmission path/recording medium 126 and is then inputted to adder 17. At the adder 17, addition of decoded picture 129 already stored/held at the frame memory 19 and difference picture 128 is carried out to output decode picture 130 thus obtained to the buffer section 9 and to output it to the frame memory 19 for a second time to store/hold it. Since the processing except for the above is similar to the previously described third embodiment of FIG. 8, explanation will be omitted.

In accordance with the ninth embodiment of FIG. 14, difference picture with respect to decode picture of previous frame obtained at the difference element 16 is sent to the communication path/transmission path/recording medium 18 in a manner as described in the previously fifth embodiment of FIG. 10 in addition to the above-described advantages/effects of the eighth embodiment of FIG. 13. Aa a result, quantity of information of decoded picture to be transmitted can be advantageously reduced to much degree. Accordingly, at the texture mapping unit side, picture which has been caused to undergo texture mapping can be displayed at a very high speed.

It is to be noted that this invention is not limited to the above-described embodiments. For encoding/decoding of texture picture, for example, decoded texture picture to which scaling has been implemented may be obtained by using hierarchical encoding/decoding or multiplexing resolution encoding/decoding also except for the above-described repetitive transform encoding/decoding.

Further, while the embodiment of this invention is realized by using the configuration shown in the block diagram, this invention is not limited only to the above-described embodiments, it may be realized by software by using CPU or memory, etc. in a manner associated therewith.

It is to be noted that, within the range which does not depart from the gist of this invention, various modifications and/or application examples are conceivable. Accordingly, the gist of this invention is not limited to the embodiments.

In accordance with this invention, there is employed such an approach to carry out iterated transform decoding while implementing scaling to picture data which has been subjected to iterated transform encoding to carry out mapping of decoded picture which has been subjected to repetitive transform decoding so that scaled shape of object is provided, whereby mapped picture images are decoded at the same time while carrying out scaling by the iterated transform decoding. Accordingly, there are provided the effects or advantages that even in the case where scaling is zooming, the feature that decoded picture can be restored without depending upon resolution, which is the feature of the repetitive transform decoding, is exhibited and degradation of picture is thus reduced to much extent as compared to the conventional system.

Further, "zooming+iterated transform decode" and "zooming of object shape" can be caused to undergo parallel processing, the processing can be advantageously carried out at high speed.

Further, since decoded picture before one loop at the iterated transform decode loop is used to calculate degree of convergence of decoded picture to carry out control of decode loop, whereby when the degree of convergence reaches a predetermined level, the processing of decode loop is completed, thereby making it possible to output decoded picture. Accordingly, in the case of the picture where convergence is fast, the processing time can be shortened.

Moreover, this display form is a progressive display form such that decoded pictures obtained within the repetitive transform decode loop are temporarily preserved (stored) at the buffer section every respective loops to carry out, at the picture mapping section 1, mapping of decoded pictures every loops from the buffer section with respect to object shape obtained from the shape information calculating section so that mapped picture images of decoded picture images updated at respective decode loops are displayed. Accordingly, such a progressive display form is advantageous in the environment where line speed is low, such as, for example, Internet.

Further, since the iterated transform decoding unit and the texture mapping unit are connected in the state spaced through the communication path/transmission path/ recording medium to carry out transmission of decode picture, it is sufficient to separately have these respective units. Accordingly, reduction of hardware and effective utilization of resource on the network can be realized.

At this time, since difference of decode picture, e.g., frame difference is caused to undergo transmission, it is possible to cope with texture mapping of iterated transform decoded picture of moving picture. Further, since difference picture with respect to decoded picture of the previous frame obtained at the difference element is sent to the communication path/transmission path/recording medium, quantity of information of decoded picture to be caused to undergo transmission is advantageously greatly reduced.

In addition, since difference pictures of decoded pictures every respective loops within decode loop are caused to occasionally undergo transmission in the state spaced through the communication path/transmission path/recording medium, thereby making it possible to display, at very high speed, picture which has been caused to undergo texture mapping at the texture mapping unit.

Industrial Applicability

This invention can be utilized in the field such as game machine, personal computer, computer graphics or CAD/CAM (Computer Aided Design/Computer Aided Manufacturing) utilizing technology for carrying out mapping (so called texture mapping) of various graphics or pictures (natural picture or character etc.) with respect polygon having three-dimensional shape.

DESCRIPTION OF REFERENCE NUMERALS

1 . . . Decode/Multiplexing Isolation Section, 2 . . . Transform Original Block producing Section, 3 . . . Scaling Section, 4 . . . Initial Picture Input Section, 5 . . . Switch, 6 . . . Picture Transform Generating Section, 7 . . . Picture Memory Section, 8 . . . Control Section, 9 . . . Buffer Section, 10 . . . Picture Mapping Section, 11 . . . Mapping Control Section, 12 . . . Shape Information Calculating Section, 13 . . . Display Unit, 14 . . . Convergence Degree Calculating/Controlling section, 15, 18, 19 .. frame memmory, 16 . . . Difference Element, 17 . . . Adder, 20 . . . Repetitive Transform Decoding Unit.

What is claimed is:

1. A picture mapping apparatus for implementing mapping to picture with respect to a predetermined object, the apparatus comprising:

an iterated transform decoding unit for carrying out an iterated transform decoding with respect to iterated transform encoded picture data while implementing scaling thereto, a buffer memory for temporarily preserving a decoded picture from the iterated transform decoding unit;

a shape information calculating section for scaling a shape of the predetermined object to calculate the scaled shape of the object;

a mapping section for mapping the decoded picture so that the scaled shape of the object is provided; and a control section for controlling the scaling operation and the mapping operation, wherein the iterated transform encoded picture data includes a block number indicating position of block and transform parameter, and wherein the repetitive transform decoding unit includes a transform source block reproducing section for reproducing transform original block on the basis of the block number to reproduce a block located at a predetermined position;

a scaling section for carrying out scaling of block to generate a scaled block;

a picture transform/generating section for implementing transform processing on the basis of the transform parameter to block picture corresponding to the scaled block; and a number of times control section for controlling the number of times for repeatedly executing the transform decode operation.

2. A picture mapping apparatus for implementing mapping to picture with respect to a predetermined object, the apparatus comprising:

an iterated transform decoding unit for carrying out an iterated transform decoding with respect to iterated transform encoded picture data while implementing scaling thereto, a buffer memory for temporarily preserving a decoded picture from the iterated transform decoding unit;

a shape information calculating section for scaling a shape of the predetermined object to calculate the scaled shape of the object;

a mapping section for mapping the decoded picture so that the scaled shape of the object is provided; and a control section for controlling the scaling operation and the mapping operation, wherein the buffer memory temporarily preserves, in succession, a respective decoded pictures obtained at a respective transform decoding operations at the time of carrying out transform decoding by the iterated transform decoding unit, and wherein the mapping section carries out mapping of the respective decoded pictures obtained by the respective transform decoding operations from the buffer memory so that the scaled shapes of the object are provided.

3. A picture mapping apparatus for implementing mapping to picture with respect to a predetermined object, the apparatus comprising:

an iterated transform decoding unit for carrying out an iterated transform decoding with respect to an iterated transform encoded picture data while implementing scaling thereto, a buffer memory for temporarily preserving a decoded picture from the iterated transform decoding unit;

a shape information calculating section for scaling a shape of the predetermined object to calculate the scaled shape of the object;

a mapping section for mapping the decoded picture so that the scaled shape of the object is provided; and a control section for controlling the scaling operation and the mapping operation, wherein picture data which has been caused to undergo iterated transform encoding includes a block number indicating position of block and transform parameter, and wherein the iterated transform decoding unit includes a transform original block reproducing section for reproducing transform original block on the basis of the block number to reproduce a block located at a predetermined position, a scaling section for carrying out scaling of block to generate a scaled block, a picture transform generating section for implementing transform processing on the basis of the transform parameter to block picture corresponding to the scaled block; and a convergence degree calculation/control section for determining degree of convergence between a current decode picture obtained by carrying out the iterated transform decoding and decode picture already decoded with respect to the current decode picture to control iterated operation of the transform decoding operation on the basis of its result.

4. A picture mapping generating apparatus implementing mapping to picture with respect to a predetermined object, which comprises:

an iterated transform decoding section for carrying out iterated transform decoding to picture data which has been caused to undergo iterated transform encoding while implementing scaling thereto; and an output section for outputting the decoded picture so that it can be utilized at a mapping section operative to implement mapping to picture with respect to a scaled shape of the object, wherein the output section for outputting outputs in succession respective decoded pictures obtained by respective transform decoding operations at the time of carrying out transform decoding operation by the iterated transform decoding section, and wherein the respective ones of the outputted decoded pictures are subjected to mapping so as to take the shapes of the object which have been caused to undergo scaling in succession at the mapping section.

5. A picture mapping generating apparatus implementing mapping to picture with respect to a predetermined object, which comprises:

an iterated transform decoding section for carrying out iterated transform decoding to picture data which has been caused to undergo iterated transform encoding while implementing scaling thereto; and an output section for outputting the decoded picture so that it can be utilized at a mapping section operative to implement mapping to picture with respect to scaled shape of the object, which further includes an arithmetic (computing) section for carrying out arithmetic operation of difference between a current decoded picture obtained by carrying out iterated transform decoding operation and decoded picture already decoded with respect to the current decoded picture, wherein the output section outputs the difference data.

6. A picture mapping apparatus for implementing mapping to picture with respect to a predetermined object, the apparatus comprising:

a shape information calculating section for scaling shape of the predetermined object to calculate the scaled shape of the object;

a mapping section for implementing mapping to a decoded picture with respect to a scaled shape of the object; and a control section for controlling the scaling operation and the mapping operation, wherein the decoded picture is decoded picture obtained by carrying out iterated transform decoding operation while implementing scaling to picture data which has been caused to undergo iterated transform encoding, wherein the decoded picture is a respective decoded pictures obtained by respective transform decoding operation at the time of carrying out transform decoding, and wherein the mapping section implements mapping to the respective decoded pictures with respect to a scaled shape of the object.

7. A picture mapping apparatus for implementing mapping to picture with respect to a predetermined object, the apparatus comprising:

a shape information calculating section for scaling shape of the predetermined object to calculate the scaled shape of the object;

a mapping section for implementing mapping to a decoded picture with respect to a scaled shape of the object; and a control section for controlling the scaling operation and the mapping operation, wherein the decoded picture is decoded picture obtained by carrying out an iterated transform decoding operation while implementing scaling to picture data which has been caused to undergo iterated transform encoding, wherein the decoded picture is delivered as a difference data between a current decoded picture obtained by carrying out the iterated transform decoding operation and decoded picture already decoded with respect to the current decoded picture, the apparatus further including an arithmetic (computing) section for adding decoded picture already delivered and the difference data to thereby generate decoded picture.

8. A picture mapping method for implementing mapping to picture with respect to a predetermined object, the method comprising:

an iterated transform decoding step of carrying out an iterated transform decoding while implementing scaling to a picture data which has been caused to undergo an iterated transform encoding operation;

a step of temporarily preserving, into buffer memory, a decoded picture obtained by the iterated transform decoding step;

a step of carrying out scaling of shape of the predetermined object to calculate a scaled shape of the object; and a mapping step, mapping is implemented to the decoded picture with respect to the scaled shape of the object, wherein the picture data which has been subjected to the iterated transform encoding operation includes a block number indicating position of block and a transform parameter, and wherein the iterated transform decoding step has substeps of:

reproducing transform original block on the basis of the block number to reproduce a block located at a predetermined position;

carrying out scaling of the block to generate a scaled block;

implementing transform processing on the basis of the transform parameter to block picture corresponding to the scaled block; and a number of times control section for controlling the number of times for repeatedly executing the transform decode operation.

9. A picture mapping method for implementing mapping to picture with respect to a predetermined object, the method comprising:

an iterated transform decoding step of carrying out an iterated transform decoding while implementing scaling to the picture data which has been caused to undergo iterated transform encoding operation;

a step of temporarily preserving, into buffer memory, a decoded picture obtained by the iterated transform decoding step;

a step of carrying out scaling of shape of the predetermined object to calculate a scaled shape of the object; and a mapping step of implementing mapping to the decoded picture with respect to the scaled shape of the object, wherein, at the time of carrying out transform decoding operation by the iterated transform decoding step, a respective decoded pictures obtained at a respective transform decoding operations are temporarily preserved in succession into the buffer memory, and wherein, at the mapping step, mapping is implemented in succession to the respective decoded pictures obtained at the respective transform decode operations from the buffer memory so that a scaled shape of object is provided.

10. A picture mapping method for implementing mapping to picture with respect to a predetermined object, the method comprising:

an iterated transform decoding step of carrying out an iterated transform decoding while implementing scaling to the picture data which has been caused to undergo an iterated transform encoding operation;

a step of temporarily preserving, into buffer memory, a decoded picture obtained by the iterated transform decoding step;

a step of carrying out scaling of shape of the predetermined object to calculate a scaled shape of the object; and a mapping step of implementing mapping to the decoded picture with respect to the scaled shape of the object, wherein the picture data which has been subjected to iterated transform encoding includes a block number indicating position of block and a transform parameter, the iterated transform decoding step comprising substeps of:

reproducing transform source block on the basis of the block number to reproduce a block located at a predetermined position;

carrying out scaling of the block to generate a scaled block;

implementing transform processing on the basis of the transform parameter to block picture corresponding to the scaled block; and determining degree of convergence between a current decoded picture obtained by carrying out the iterated transform decoding and decoded picture already decoded with respect to the current decoded picture to repeatedly execute transform decoding on the basis of its result.

11. A picture generating method for generating picture for implementing mapping to picture with respect to a predetermined object, the method comprising:

an iterated transform decoding step of carrying out iterated transform decoding to a picture data which has been caused to undergo an iterated transform encoding while implementing scaling thereto, and an output step of outputting a decoded picture so that it is utilized at mapping section for implementing mapping to picture with respect to a scaled shape of the object, wherein the picture data which has been caused to undergo the iterated transform encoding includes a block number indicating position of block and a transform parameter, the iterated transform decoding step comprising:

reproducing transform original block on the basis of the block number to reproduce a block located at a predetermined position;

carrying out scaling of the block to generate scaled block; and implementing transform processing on the basis of the transform parameter to block picture corresponding to the scaled block; and a number of times control section for controlling the number of times for repeatedly executing the transform decode operation.

12. A picture generation method for generating picture for implementing mapping to picture with respect to a predetermined object, the method comprising:

an iterated transform decoding step of carrying out an iterated transform decoding to picture data which has been caused to undergo iterated transform encoding while implementing scaling thereto, and an output step of outputting a decoded picture so that it is utilized at mapping section for implementing mapping to picture with respect to scaled shape of the object, wherein the output step temporarily outputs in succession a respective decoded pictures obtained by respective transform decoding operations at the time of carrying out the iterated transform decoding, and wherein the respective ones of the outputted the decoded pictures are mapped so that a shape of the object scaled in succession at the mapping step are provided.

13. A picture generation method for generating picture for implementing mapping to picture with respect to a predetermined object, the method comprising:

an iterated transform decoding step of carrying out an iterated transform decoding to picture data which has been caused to undergo an iterated transform encoding while implementing scaling thereto, and an output step of outputting the decoded picture so that it is utilized at mapping section for implementing mapping to picture with respect to scaled shape of the object, wherein the picture data which has been caused to undergo the iterated transform encoding includes a block number indicating position of block and a transform parameter, the iterated transform decoding step comprising substeps of:

reproducing transform original block on the basis of the block number to reproduce a block located at a predetermined position;

carrying out scaling of the block to generate a scaled block;

implementing transform processing on the basis of the transform parameter with respect to block picture corresponding to the scaled block; and determining degree of convergence between current decoded picture obtained by carrying out the iterated transform decoding and decoded picture already decoded with respect to the current decoded picture to control iterated operation of the transform decoding operation on the basis of its result.

14. A picture generation method for generating picture for implementing mapping to picture with respect to a predetermined object, the method comprising:

an iterated transform decoding step of carrying out an iterated transform decoding to picture data which has been caused to undergo iterated transform encoding while implementing scaling thereto, and an output step of outputting the decoded picture so that it is utilized at mapping section for implementing mapping to picture with respect to scaled shape of the object, which further comprises a step of calculating difference between a current decoded picture obtained by carrying out the iterated transform decoding and decoded picture already decoded with respect to the current decoded picture, and wherein the output step outputs difference data.

15. A picture mapping method for implementing mapping to picture with respect to a predetermined object, the method comprising:
- a step of scaling shape of a predetermined object to calculate a scaled shape of the object; and
- a mapping step of mapping a decoded picture so that the scaled shape of the object is provided,
- wherein the decoded picture is decoded picture obtained by carrying out an iterated transform decoding while implementing scaling to the picture data which has been caused to undergo iterated transform encoding,
- wherein the iterated transform encoded picture data includes a block number indicating position of block and a transform parameter, and
- wherein the decoded picture is generated by substeps of:
  - reproducing transform original block on the basis of the block number to reproduce a block located at a predetermined position;
  - carrying out scaling of block to generate a scaled block;
  - implementing transform processing on the basis of the transform parameter to block picture corresponding to the scaled block, and
  - repeatedly executing transform decoding operation.

16. A picture mapping method for implementing mapping to picture with respect to a predetermined object, the method comprising:
- a step of scaling shape of the predetermined object to calculate a scaled shape of the object; and
- a mapping step of mapping a decoded picture so that the scaled shape of the object is provided,
- wherein the decoded picture is decoded picture obtained by carrying out an iterated transform decoding while implementing scaling to the picture data which has been caused to undergo iterated transform encoding,
- wherein the decoded picture is a respective decoded pictures obtained by respective transform decoding operation at the time of carrying out the iterated transform decoding, and
- wherein, at the mapping step, mapping is implemented to the respective decoded pictures with respect to a shape of the object scaled in succession.

17. A picture mapping method for implementing mapping to picture with respect to a predetermined object, the method comprising:
- a step of scaling shape of the predetermined object to calculate a scaled shape of the object; and
- a mapping step of mapping a decoded picture so that the scaled shape of the object is provided,
- wherein the decoded picture is decoded picture obtained by carrying out an iterated transform decoding while implementing scaling to the picture data which has been caused to undergo iterated transform encoding,
- wherein the iterated transform encoded picture data consists of a block number indicating position of block and a transform parameter, and
- wherein the decode picture is obtained by
  - reproducing transform source block on the basis of the block number to reproduce a block located at a predetermined position,
  - carrying out scaling of the block to generate the scaled block,
  - implementing transform processing on the basis of the transform parameter to block picture corresponding to the scaled block, and
  - determining degree of convergence between a current decoded picture obtained by carrying out the iterated transform decoding and decoded picture already decoded picture with respect to the current decoded picture to repeatedly execute transform decoding on the basis of its result.

18. A picture mapping method for implementing mapping to picture with respect to a predetermined object, the method comprising:
- a step of scaling shape of the predetermined object to calculate a scaled shape of the object; and
- a mapping step of mapping a decoded picture so that the scaled shape of the object is provided,
- wherein the decoded picture is decoded picture obtained by carrying out an iterated transform decoding while implementing scaling to the picture data which has been caused to undergo iterated transform encoding,
- wherein the decoded picture is delivered as a difference data between a current decoded picture obtained by carrying out the iterated transform decoding and decoded picture already decoded with respect to the current decoded picture,
- the method further comprising an arithmetic (computing) step of adding the already delivered decoded picture and the difference data to thereby generate decoded picture.

* * * * *